US012403669B2

(12) United States Patent
Boegli et al.

(10) Patent No.: US 12,403,669 B2
(45) Date of Patent: Sep. 2, 2025

(54) METHOD AND TOOL FOR EMBOSSING OF BARRIER PAPER

(71) Applicant: BOEGLI-GRAVURES SA, Marin-Epagnier (CH)

(72) Inventors: Charles Boegli, Marin-Epagnier (CH); Gabriel Dumitru, Nussbaumen (CH)

(73) Assignee: BOEGLI-GRAVURES SA, Marin-Epagnier (CH)

( * ) Notice: Subject to any disclaimer, the term of this patent is extended or adjusted under 35 U.S.C. 154(b) by 0 days.

(21) Appl. No.: 18/682,821

(22) PCT Filed: Aug. 13, 2021

(86) PCT No.: PCT/IB2021/057480

§ 371 (c)(1),
(2) Date: Feb. 9, 2024

(87) PCT Pub. No.: WO2023/017302

PCT Pub. Date: Feb. 16, 2023

(65) Prior Publication Data

US 2024/0343013 A1 Oct. 17, 2024

(51) Int. Cl.
*B31F 1/07* (2006.01)

(52) U.S. Cl.
CPC ........ *B31F 1/07* (2013.01); *B31F 2201/0743* (2013.01); *B31F 2201/0761* (2013.01); *B31F 2201/0784* (2013.01)

(58) Field of Classification Search
CPC ................ B31F 1/07; B31F 2201/0743; B31F 2201/0761; B31F 2201/0784
See application file for complete search history.

(56) References Cited

U.S. PATENT DOCUMENTS 5,007,271 A 4/1991 Boegli
5,598,774 A 2/1997 Boegli
(Continued)

FOREIGN PATENT DOCUMENTS

AU 772613 B 1/1913
CA 2382597 A1 11/2000
(Continued)

OTHER PUBLICATIONS

International Search Report for PCT/IB2021/057480 dated Jul. 15, 2022, 7 pages.
(Continued)

*Primary Examiner* — David H Banh
(74) *Attorney, Agent, or Firm* — NIXON & VANDERHYE

(57) ABSTRACT

A method for embossing a barrier paper, wherein the barrier paper comprises paper and a protective layer on at least one of its sides. The method comprises providing a first embossing system with a first embossing tool and a second embossing tool cooperating with the first embossing tool to emboss the barrier paper: providing a patrix structure on the first embossing tool: providing a matrix structure on the second embossing tool: whereby the matrix structure corresponds to the patrix structure in such a manner that when embossing the barrier paper, a functionality of the protective layer is preserved. The method further comprises embossing the barrier paper by inserting the barrier paper between the first and the second embossing tools, applying pressure between the patrix and the matrix structures to press the patrix structure on a paper side which is a side of the barrier paper opposite to the side with the protective layer of the barrier paper, and push the barrier paper in the matrix structure, whereby the protective layer faces the matrix structure, thereby modifying a fiber structure of the paper in the barrier
(Continued)

5a paper by at least one of the following effects: breaking of paper fibers, compressing of the paper fibers, densifying of the paper fibers; resulting in a modified folding behavior of the barrier paper and in maintaining a substantially unchanged shape of the barrier paper over its lifetime.

18 Claims, 15 Drawing Sheets

(56) References Cited

U.S. PATENT DOCUMENTS

| | | | | |
|---|---|---|---|---|
| 6,176,819 | B1 | 1/2001 | Boegli | |
| 6,665,998 | B1 | 12/2003 | Boegli | |
| 6,715,411 | B1 | 4/2004 | Boegli | |
| 7,036,347 | B2 | 5/2006 | Boegli | |
| 7,147,453 | B2 | 12/2006 | Boegli | |
| 7,229,681 | B2 | 6/2007 | Boegli | |
| 8,038,922 | B2 | 10/2011 | Boegli | |
| 8,097,322 | B1 * | 1/2012 | Osorio | A47K 10/16 428/43 |
| 8,430,663 | B2 | 4/2013 | Boegli | |
| 8,464,623 | B2 | 6/2013 | Peshkar | |
| 8,495,900 | B2 | 7/2013 | Boegli | |
| 8,932,044 | B2 | 1/2015 | Boegli | |
| 9,140,834 | B2 | 9/2015 | Boegli | |
| 9,156,107 | B2 | 10/2015 | Boegli | |
| 9,180,643 | B2 | 11/2015 | Boegli | |
| 9,481,141 | B2 | 11/2016 | Boegli | |
| 9,505,167 | B2 | 11/2016 | Boegli | |
| 9,579,924 | B2 | 2/2017 | Boegli | |
| 9,636,885 | B2 | 5/2017 | Boegli | |
| 9,809,927 | B2 | 11/2017 | Boegli | |
| 9,939,725 | B2 | 4/2018 | Boegli | |
| 9,993,895 | B2 | 6/2018 | Boegli | |
| 10,083,253 | B2 | 9/2018 | Boegli | |
| 10,183,318 | B2 | 1/2019 | Boegli | |
| 2004/0076798 | A1 * | 4/2004 | Larsson | D21H 25/005 428/153 |
| 2005/0279147 | A1 | 12/2005 | Boegli | |
| 2005/0280182 | A1 * | 12/2005 | Boegli | B29C 59/04 425/363 |
| 2010/0061619 | A1 | 3/2010 | Boegli | |
| 2010/0326613 | A1 * | 12/2010 | Denis | B32B 7/12 162/109 |
| 2012/0018993 | A1 | 1/2012 | Boegli | |
| 2012/0292821 | A1 | 11/2012 | Boegli | |
| 2014/0059977 | A1 | 3/2014 | Boegli | |
| 2015/0321439 | A1 * | 11/2015 | Vogelskamp | B31F 1/07 428/34.3 |
| 2016/0075077 | A1 | 3/2016 | Boegli | |
| 2017/0066079 | A1 | 3/2017 | Reisse | |
| 2017/0282635 | A1 * | 10/2017 | Boegli | A61J 1/00 |
| 2017/0313018 | A1 * | 11/2017 | Pessotto | B31F 1/07 |
| 2018/0220698 | A1 | 8/2018 | Boegli | |
| 2018/0370175 | A1 * | 12/2018 | Boegli | B31F 1/07 |
| 2020/0086600 | A1 | 3/2020 | Boegli | |
| 2020/0324505 | A1 | 10/2020 | Boegli | |
| 2021/0078281 | A1 * | 3/2021 | Schweikhardt | B44B 5/0009 |
| 2021/0129478 | A1 | 5/2021 | Boegli | |
| 2021/0154964 | A1 | 5/2021 | Boegli | |
| 2021/0237199 | A1 | 8/2021 | Boegli | |
| 2021/0260633 | A1 | 8/2021 | Boegli | |
| 2021/0276298 | A1 | 9/2021 | Boegli | |
| 2022/0347962 | A1 | 11/2022 | Boegli | |
| 2023/0249430 | A1 | 8/2023 | Boegli | |
| 2023/0356454 | A1 | 11/2023 | Boegli | |
| 2024/0017458 | A1 | 1/2024 | Boegli | |

FOREIGN PATENT DOCUMENTS

| | | | |
|---|---|---|---|
| CA | 2367423 | C | 5/2008 |
| CN | 109650142 | A | 4/2019 |
| DE | 3545169 | A1 | 7/1987 |
| DE | 69407217 | T2 | 7/1998 |
| DE | 202017105458 | U1 | 10/2017 |
| EP | 2327502 | A1 | 6/2011 |
| EP | 2327503 | A1 | 6/2011 |
| EP | 2572820 | A1 | 3/2013 |
| EP | 2653301 | A1 | 10/2013 |
| EP | 3300612 | A1 | 4/2018 |
| EP | 3415306 | A1 | 12/2018 |
| EP | 3718915 | A1 | 10/2020 |
| FR | 2705273 | A1 | 11/1994 |
| JP | 2015-147589 | A | 8/2015 |
| RU | 2393093 | C2 | 6/2010 |
| WO | 2006/016005 | A1 | 2/2006 |
| WO | 2007012215 | A1 | 2/2007 |
| WO | 2007/144469 | A1 | 12/2007 |
| WO | 2018/109706 | A1 | 6/2018 |
| WO | 2022243917 | A1 | 11/2022 |

OTHER PUBLICATIONS

Written Opinion of the ISA for PCT/IB2021/057480 dated Jul. 15, 2022, 15 pages.

* cited by examiner

METHOD AND TOOL FOR EMBOSSING OF BARRIER PAPER

CROSS-REFERENCE TO RELATED APPLICATIONS

This application is the U.S. national phase of International Application No. PCT/IB2021/057480 filed Aug. 13, 2021 which designated the U.S., the entire contents of which are hereby incorporated by reference.

TECHNICAL FIELD

The invention relates to a method and a tool for embossing of barrier paper, wherein the barrier paper comprises a protective barrier zone on one of its sides.

BACKGROUND

It is known to emboss packaging material according to technologies as known from international publication WO2013156256. Such packaging material can for example be tipping paper, cigarette paper, innerliner or innerframe paper, hybrid paper, a synthetic foil, paperboard or cardstock for packaging tobacco products, as well as food or pharmaceutical items. The technologies displayed consist in shaping the surface structures of the rollers of a set independently of each other rather than first shaping the male roller and then the female roller in a physically dependent relationship. The technologies disclosed enable that the individual manufacture of male and female rollers allows to achieve a reduction of the transverse tensions due to the fact that the female structures are not inversely congruent, i.e., do not exactly correspond to the associated male structures. Since the dimensions and shapes of the male structures, e.g., teeth, do not exactly correspond to those of the indentations in the female roller, not only the quality of the embossing is improved but also a sufficient reduction of the transverse tensions in the embossed foil is achieved. In the case of the disclosed male-female rollers, this applies not only to the embossing of relatively narrow tipping webs but more generally to embossing structures arranged in rows. The technology enables for example as shown in FIG. 3 to emboss rhombi having longitudinal diagonal of 4 to 6 mm, and a transverse diagonal of 1.5 mm to 3 mm. The international publication also discloses variants of roller pairs having zones for producing folding creases, by means of male and female structures that have been produced independently of each other. Such creases are advantageous in cases where it is difficult to wrap the foil around objects such as tobacco products without interfering with the on-line packaging process. Furthermore, embossing of not inversely congruent features using roller pairs, into paper-based packaging material, as used in hermetically a sealed package, has the advantage of significantly diminishing any shape deformation of the sealed package that may occur subsequent to the sealing process, in other words, this type of embossing enables to maintain the shape of the sealed package substantially unchanged over its lifetime.

It is further known to emboss packaging material with microstructures, i.e., structures that have a height which lies in the range of 10 μm to 150 μm. As an example, international publication WO2017108516A1 relates to a device for fine embossing of packaging material with a set of embossing rolls of the male/female (patrix/matrix) type. In this publication, the microstructures are also designated as "light-scattering elements." FIGS. 4A, 5A, 6A and 7A of WO2017108516A1 show examples of the use of microstructures to be embossed, wherein these are situated respectively on top of a patrix structure (FIG. 4A of WO2017108516A1), at the bottom of a matrix structure (FIG. 5A of WO2017108516A1), or on the mean surface of the embossing tool, which may surround the patrix structure of the matrix structure (FIGS. 6A and 7A of WO2017108516A1). In each example a corresponding smooth surface (represented with straight lines in all the referenced figures) on the corresponding opposite embossing tool is used to press a packaging material against the microstructure at a time of embossing.

Various known processes may be applied to produce the microstructures. One of those processes is known from international publication WO2013156256 described hereinabove and illustrated in FIG. 9 thereof. Hence no further explanation will be provided here.

The packaging material industry is currently undergoing an environmental transformation that aims to ban metals and certain types of plastic. For years, non-recyclable polyethylene coated, multilayer laminated flexible materials and aluminum foil have been the main options for packaging perishables, but the situation has changed. Accordingly, there is an increased interest for paper-based packaging foils that can be recycled using the already existing infrastructure. However, for the paper to have similar shielding or protective properties as metal and/or plastic containing packaging material, it has been found that the paper must be provided with a protective layer on one of its sides, for example a protective layer of water or solvent based materials or any other protective layer. The environmental advantage of this solution is given by the fact that it is possible to have a barrier paper containing a protective layer that could still be put into existing recycling streams.

Accordingly, it is an aim of the present invention, to provide a method and appropriate apparatus for embossing the new type of barrier paper having the protective barrier zone, without damaging the paper and more particularly while preserving the properties of the protective barrier zone.

A further aim of the present invention is to provide a method and apparatus that allows to modify parameters of the protective barrier zone at a time of embossing in order to improve its protective properties.

Definitions and Vocabulary

In the following certain terms as used throughout the description and in the claims are introduced and defined for reference.

Paper: cellulose fibers-based sheet material that may include additives and/or lacquers, wherein the latter may serve other purposes than barrier properties;

Barrier: layer or zone of an entity that is configured to do anyone or several of the following: stopping or slowing moisture passage, reducing water vapor/oxygen transfer rate, diminishing heat transfer, preserving aroma when used to package corresponding food or tobacco for example;

Barrier paper: a paper-based packaging sheet material that contains at least a protective layer of another material, e.g., lacquers, varnishes, or water-based, solvent-based, vacuum deposition or hot-melt coatings preferably on its surface, in order to provide moisture, oxygen, heat, aroma, etc. barrier effect.

Essential properties of typical barrier papers may be listed as follows:

(i) grammage roughly between 40 g/m$^2$ and 100 g/m$^2$, (ii) thicknesses roughly between 50 μm and 150 μm, (iii) water vapor transmission rates (WVTR) in the range of 1 g/($m^2$×day) to 250 g/($m^2$×day), (iv) oxygen transmission rates (OTR) in the range of 1 $cm^3$/($m^2$×day) to 100 $cm^3$/($m^2$×day), depending on the type and of the thickness of the used protective film, and also on the external atmospheric conditions, e.g., temperature, relative humidity.

For comparison, a 9 μm pure aluminum film exhibits a WVTR value of roughly 0.01 g/($m^2$×day) and an OTR value of less than 0.01 $cm^3$/($m^2$×day).

Protective layer: an added layer of material different than that of the paper, e.g., a polymer-based layer, configured to provide determined barrier properties, i.e., determined functionalities; layer zone of paper modified to adopt determined barrier properties, i.e., determined functionalities. The term can also be used alternatively to the term "barrier". A protective layer may also act as a sealing layer, if appropriate, e.g., thermoplastic, polymers are included in its composition;

Transfer: any one of for example, shaping, printing, molding, crafting, pressing, and embossing onto a substrate, of at least a three-dimensional topographical element formed on a solid piece;

Tool: a material part having surface structures on at least one surface, the material being for example metal, ceramics, in bulk or layer form, and meant to transfer its surface structure onto another material;

Roller: a tool characterized by a cylindrical symmetry, and dimensions of, for example, a length <5 m, and a diameter <1 m, profiled with surface structures on its lateral surface;

Embossing: the process of transferring the features from at least one roller or from a tool onto a fluid or solid substrate or onto another solid piece;

Patrix-matrix embossing: embossing process in which a patrix structure presses the material to emboss inside of a matrix structure;

Patrix structure: a positive projection of a structure to emboss, departing from a mean surface of a patrix-embossing tool;

Matrix structure: a negative projection of a structure to emboss, complementary to a corresponding patrix structure, entering the mean surface of a matrix-embossing tool complementary to the patrix-embossing tool;

Congruency: a complementarity of the patrix and matrix structures based on the substantial homotheticity of the positive and of the negative projections of the feature to emboss;

Microstructure(s): surface topography feature(s) projecting from a mean surface, for example a mean surface of an embossing tool or a mean surface of a macroscopic structure located on the embossing tool such as a top of a patrix structure or a bottom of a matrix structure, having determined lateral dimensions and a determined height size between 1 μm and 100 μm, meant to be embossed into a protective layer of a barrier paper;

Smooth surface: surface that fails to comprise any microstructure(s), and may be considered substantially flat when looking at a plate-type embossing tool, and part of a cylindrical surface when looking at a roller-type embossing tool. Preferably, the roughness ($R_a$) of a smooth surface will be less than 250 nm.

Quick exchange device: an embossing system comprising an interchangeable unit, based on a mount with very precisely adapted seats, which are very precisely adapted to the interchangeable unit. In the inserted condition, i.e., when the fitting surfaces of the retaining elements are inserted in the associated seats, the embossing roll contained in an interchangeable unit is thus placed in its operational position without requiring any further adjusting operations.

SUMMARY OF INVENTION

In a first aspect, the invention provides a method for embossing a barrier paper, wherein the barrier paper comprises paper and a protective layer on at least one of its sides. The method comprises providing a first embossing system with a first embossing tool and a second embossing tool cooperating with the first embossing tool to emboss the barrier paper; providing a patrix structure on the first embossing tool; providing a matrix structure on the second embossing tool; whereby the matrix structure corresponds to the patrix structure in such a manner that when embossing the barrier paper, a functionality of the protective layer is preserved. The method further comprises embossing the barrier paper by inserting the barrier paper between the first and the second embossing tools, applying pressure between the patrix and the matrix structures to press the patrix structure on a paper side which is a side of the barrier paper opposite to the side with the protective layer of the barrier paper, and push the barrier paper in the matrix structure, whereby the protective layer faces the matrix structure, thereby modifying a fiber structure of the paper in the barrier paper by at least one of the following effects: breaking of paper fibers, compressing of the paper fibers, densifying of the paper fibers; resulting in a modified folding behavior of the barrier paper and in maintaining a substantially unchanged shape of the barrier paper over its lifetime.

In a preferred embodiment, the method further comprises providing at least a portion of a smooth surface structure on the first embossing tool; providing a plurality of microscopic structures protruding from the surface on at least a surface on the second embossing tool, configured to correspond to the smooth surface structure at a time of embossing; and embossing the barrier paper by applying pressure between the smooth surface structure and the microscopic structures to press the smooth surface structure on the paper side of the barrier paper, whereby the protective layer faces the microscopic structures, thereby enhancing determined barrier properties of the barrier paper to at least one of the following effects: densifying the protective layer, modifying hydrophobic properties of the protective layer, adding folding properties to the protective layer, modifying optical properties of the protective layer, modifying tactile properties of the protective layer.

In a further preferred embodiment, the first and second embossing tools are mounted in a quick exchange device.

In a further preferred embodiment, the method further comprises heating at least one of the first and second embossing tools, and/or the barrier paper at the step of embossing the barrier paper.

In a further preferred embodiment, the method further comprises previously to feeding the barrier paper through the first embossing system; providing a second embossing system with a third embossing tool and a fourth embossing tool which is configured to cooperate with the third embossing tool to emboss the barrier paper; providing at least a smooth surface structure on the third embossing tool; providing a plurality of microscopic structures protruding from the surface on the fourth embossing tool; embossing the barrier paper by inserting the barrier paper between the third and fourth embossing tool, applying pressure between the smooth surface structure and the microscopic structures to press the smooth surface structure on the paper side of the barrier paper, whereby the protective layer faces the microscopic structures, thereby enhancing determined barrier properties of the barrier paper to at least one of the following effects; densifying the protective layer, modifying hydrophobic properties of the protective layer, adding folding properties to the protective layer, modifying optical properties of the protective layer, modifying tactile properties of the protective layer; and feeding the embossed barrier paper to the first embossing system.

In a further preferred embodiment, the smooth surface is provided on an entirety of a working surface of the third embossing tool, and the plurality of microscopic structures is provided on an entirety of a working surface of the fourth embossing tool.

In a further preferred embodiment, the method further comprises heating at least one of the third and fourth embossing tools, and/or the barrier paper at the step of embossing the barrier paper.

In a further preferred embodiment, the method further comprises embossing the plurality of microscopic structures from the fourth tool into a UV-sensitive protective layer and using UV radiation to cure the embossed microstructures.

In a further preferred embodiment, the protective layer comprises an added layer of material different than that of the paper, configured to provide determined barrier properties, or a layer-zone of paper modified to provide the determined barrier properties.

In a further preferred embodiment, in order to preserve the functionality of the protective layer, the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made, is substantially a second circular arc having a second radius R2, whereby R2>R1.

In a further preferred embodiment, the first radius R1 is larger than 15 μm.

In a further preferred embodiment, in order to preserve the functionality of the protective layer, the patrix structure is configured to comprise at a summit of the patrix structure a first surface S1 and the matrix structure is configured to comprise at a bottom of the matrix surface a second surface S2, such that when a first embossing force F is applied to the patrix structure a first local contact pressure F/S1 with the paper side on the side of the patrix structure has a value greater than a second local contact pressure F/S2 with the protective layer on the side of the matrix structure.

In a further preferred embodiment, the barrier paper comprises an additional protective layer on a side of the barrier paper opposite to the side of the protective layer, and in order to preserve the integrity of the protective layer, the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made, is substantially a second circular arc having a second radius R2, whereby the first radius R1 and the second radius R2 differ by less than 25%.

In a further preferred embodiment, the first radius R1 and the second radius R2 are each larger than 25 μm.

In a further preferred embodiment, the method further comprises configuring the patrix structure and the matrix structure such that at a time of embossing the barrier paper in the first embossing system, there is a gap creating a locally enlarged distance between a summit of the patrix structure and a bottom of the matrix structure that is large than a thickness of the barrier paper, thereby enabling to avoid pressing the microscopic structures embossed in the second embossing system.

In a further preferred embodiment, the gap measures between 5 μm and 50 μm.

In a second aspect, the invention provides an apparatus for embossing a barrier paper, wherein the barrier paper comprises paper and a protective layer on at least one of its sides, the apparatus comprising a first embossing system with a first embossing tool and a second embossing tool which is configured to cooperate with the first embossing tool to emboss the barrier paper; a patrix structure on the first embossing tool; a matrix structure on the second embossing tool; whereby the matrix structure corresponds to the patrix structure in such a manner that at a time of embossing the barrier paper, a functionality of the protective layer is preserved; and whereby further the first embossing system is configured to receive the barrier paper when it is inserted between the first and the second embossing tools, and to apply a pressure between the patrix and the matrix structure to press the patrix structure on the paper side of the barrier paper, and push the barrier paper in the matrix structure, whereby the protective layer faces the matrix structure, thereby modifying a fiber structure of the paper in the barrier paper by at least one of the following effects: breaking paper fibers, compressing of the paper fibers, densifying of the paper fibers; resulting in a modified folding behavior of the barrier paper and in maintaining a substantially unchanged shape of the barrier paper over its lifetime.

In a preferred embodiment, the apparatus further comprises at least a portion of a smooth surface structure on the first embossing tool; a plurality of microscopic structures protruding from the surface on the second embossing tool on at least a surface which corresponds to the smooth surface structure at a time of embossing; and whereby the first embossing system is further configured to apply a pressure between the smooth surface structure on the paper side of the barrier paper, whereby the protective layer faces the microscopic structures, thereby enhancing determined barrier properties of the barrier paper to at least one of the following effects: densifying the protective layer, modifying hydrophobic properties of the protective layer, adding folding properties to the protective layer, modifying optical properties of the protective layer, modifying tactile properties of the protective layer.

In a further preferred embodiment, the first and second embossing tools are mounted in a quick exchange device.

In a further preferred embodiment, the apparatus further comprises a heating means configured to heat at least one of the first and second embossing tools, and/or the barrier paper at the time of embossing the barrier paper.

In a further preferred embodiment, the apparatus further comprises a second embossing system with a third embossing tool and a fourth embossing tool configured to cooperate with the third embossing tool to emboss the barrier paper; at least a smooth surface on the third embossing tool; a plurality of microscopic structures protruding from the surface on the fourth embossing tool; whereby the second embossing system is configured to receive the barrier paper when it is inserted between the third and the fourth embossing tools, and to apply a pressure between the flat structure on the paper side of the barrier paper, whereby the protective layer faces the microscopic structures, thereby enhancing determined barrier properties of the barrier paper to at least one of the following effects: densifying the protective layer, modifying hydrophobic properties of the protective layer, adding folding properties to the protective layer, modifying optical properties of the protective layer, modifying tactile properties of the protective layer; and whereby further the second embossing system is configured to feed the embossed barrier paper to the first embossing system.

In a further preferred embodiment, the smooth surface is provided on an entirety of a working surface of the third embossing tool, and the plurality of microscopic structures is provided on an entirety of a working surface of the fourth embossing tool.

In a further preferred embodiment, the apparatus further comprises a heating means configured to heat at least one of the third and fourth embossing tools, and/or the barrier paper at the time of embossing the barrier paper.

In a further preferred embodiment, the protective layer comprises an added layer of material different than that of the paper, configured to provide determined barrier properties, or a layer-zone of paper modified to provide the determined barrier properties.

In a further preferred embodiment, in order to preserve the integrity of the protective layer, the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface (506) of the second embossing tool in which the matrix structure is made, is substantially a second circular arc having a second radius R2, whereby R2>R1.

In a further preferred embodiment, the first radius is larger than 15 μm.

In a further preferred embodiment, in order to preserve the integrity of the protective layer, the patrix structure is configured to comprise at a summit of the patrix structure a first surface S1 and the matrix structure is configured to comprise at a bottom of the matrix surface a second surface S2, such that when a first embossing force F is applied to the patrix structure a first local contact pressure F/S1 with the paper side on the side of the patrix structure has a value greater than a second local contact pressure F/S2 with the protective layer on the side of the matrix structure.

In a further preferred embodiment, the barrier comprises an additional protective layer on a side of the barrier paper opposite to the side of the protective layer, and in order to preserve the integrity of the protective layer, the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made, is substantially a second circular arc having a second radius R2, whereby the first radius R1 and the second radius R2 differ by less than 25%.

In a further preferred embodiment, the first radius R1 and the second radius R2 are each larger than 25 μm.

In a further preferred embodiment, the patrix structure and the matrix structure are configured such that at a time of embossing the barrier paper in the first embossing system, there is a gap creating a locally enlarged distance between a summit of the patrix structure and a bottom of the matrix structure that is large than a thickness of the barrier paper, thereby enabling to avoid pressing the microscopic structures embossed in the second embossing system.

In a further preferred embodiment, the gap measures between 5 μm and 50 μm.

In a third aspect, the invention provides a method for embossing a barrier paper, wherein the barrier paper comprises a protective layer on at least one of its sides, the method comprising providing a first embossing system with a first embossing tool and a second embossing tool cooperating with the first embossing tool to emboss the barrier paper; providing a patrix structure on the first embossing tool; providing a matrix structure on the second embossing tool; whereby the matrix structure corresponds to the patrix structure in such a manner that when embossing the barrier paper, a functionality of the barrier paper is preserved; embossing the barrier paper by inserting the barrier paper between the first and the second embossing tools, applying pressure between the patrix and the matrix structures to press the patrix structure on a side of the barrier paper with the protective layer, and push the barrier paper in the matrix structure, whereby a paper side of the barrier paper faces the matrix structure, thereby modifying a fiber structure of the paper in the barrier paper by at least one of the following effects: breaking of the paper fiber, compressing of the paper fibers, densifying of the paper fiber; resulting in a modified folding behavior of the barrier paper and in maintaining a substantially unchanged shape of the barrier paper over its lifetime.

In a preferred embodiment, the method further comprises providing at least a portion of a surface of the first embossing tool with a plurality of microscopic structures protruding from the surface; providing a smooth surface structure on the second embossing tool configured to correspond to the at least one portion of the surface of the first embossing tool at a time of embossing; and embossing the barrier paper by applying pressure between the smooth surface structure and the microscopic structures to press the smooth surface structure on the paper side of the barrier paper, whereby the protective layer faces the microscopic structures, thereby enhancing determined barrier properties of the barrier paper to at least one of the following effects: densifying the protective layer, modifying hydrophobic properties of the protective layer, adding folding properties to the protective layer, modifying optical properties of the protective layer, modifying tactile properties of the protective layer.

In a further preferred embodiment, the first and second embossing tools are mounted in a quick exchange device.

In a further preferred embodiment, the method further comprises heating at least one of the first and second embossing tools, and/or the barrier paper at the step of embossing the barrier paper.

In a further preferred embodiment, the method further comprises previously to feeding the barrier paper through the first embossing system, providing a second embossing case with a third embossing tool and a fourth embossing tool which is configured to cooperate with the third embossing tool to emboss the barrier paper; providing a plurality of microscopic structures protruding from the surface on the third embossing tool; providing at least a smooth surface structure on the fourth embossing tool; embossing the barrier paper by inserting the barrier paper between the third and fourth embossing tool, applying pressure between the smooth surface structure and the microscopic structures to press the smooth surface structure on the paper side of the barrier paper, whereby the protective layer faces the microscopic structures, thereby enhancing determined barrier properties of the barrier paper to at least one of the following effects; densifying the protective layer, modifying hydrophobic properties of the protective layer, adding folding properties of the protective layer, modifying optical properties of the protective layer, modifying tactile properties of the protective layer; and feeding the embossed barrier paper to the first embossing system.

In a further preferred embodiment, the smooth surface is provided on an entirety of a working surface of the fourth embossing tool, and the plurality of microscopic structures is provided on an entirety of a working surface of the fourth embossing tool.

In a further preferred embodiment, the method further comprises heating at least one of the third and fourth embossing tools, and/or the barrier paper at the step of embossing the barrier paper.

In a further preferred embodiment, the method further comprises embossing the plurality of microscopic structures from the from the fourth tool into a UV-sensitive protective layer and using UV radiation to cure the embossed microstructures.

In a further preferred embodiment, the protective layer comprises an added layer of material different than that of the paper, configured to provide determined papier properties, or a layer-zone of paper modified to provide the determined barrier properties.

In a further preferred embodiment, in order to preserve the integrity of the protective layer, the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made, is substantially a second circular arc having a second radius R2, whereby R1>R2.

In a further preferred embodiment, the first radius R1 is larger than 15 μm.

In a further preferred embodiment, in order to preserve the integrity of the protective layer, the patrix structure is configured to comprise at a summit of the patrix structure a third surface S3 and the matrix structure is configured to comprise at a bottom of the matrix surface a fourth surface S4, such that when a first embossing force F is applied to the patrix structure a first local contact pressure F/S3 with the protective layer on the side of the patrix structure has a value smaller than a second local contact pressure F/S2 with the paper side on the side of the matrix structure.

In a further preferred embodiment, the barrier paper comprises an additional protective layer (103) on a side of the barrier paper opposite to the side of the protective layer (102), and in order to preserve the integrity of the protective layer, the patrix structure (501) and the matrix structure (500) are configured such that a first junction between a lateral side (502) of the patrix structure (501) and a first base surface (503) of the first embossing tool (504) from which the patrix structure (501) protrudes is substantially a first circular arc having a first radius R1, and a second junction between a lateral side (505) of the matrix structure (500) and a second base surface (506) of the second embossing tool (507) in which the matrix structure (500) is made, is substantially a second circular arc having a second radius R2, whereby the first radius R1 and the second radius R2 differ by less than 25%.

In a further preferred embodiment, the first radius R1 and the second radius R2 are each larger than 25 μm.

In a further preferred embodiment, the method further comprises configuring the patrix structure and the matrix structure such that at a time of embossing the barrier paper in the first embossing system, there is a gap creating a locally enlarged distance between a summit of the patrix structure and a bottom of the matrix structure that is large than a thickness of the barrier paper, thereby enabling to avoid pressing the microscopic structures embossed in the second embossing system.

In a further preferred embodiment, the gap measures between 5 μm and 50 μm.

In a fourth aspect, the invention provides an apparatus for embossing of a barrier paper, wherein the barrier paper comprises paper and a protective layer on one of its sides, the apparatus comprising a first embossing system with a first embossing tool and a second embossing tool which is configured to cooperate with the first embossing tool to emboss the barrier paper; a patrix structure on the first embossing tool; a matrix structure on the second embossing tool; whereby the matrix structure corresponds to the patrix structure in such a manner that at a time of embossing the barrier paper, a functionality of the protective layer is preserved; whereby further the first embossing system is configured to receive the barrier paper when it is inserted between the first and the second embossing tools, and to apply a pressure between the patrix and the matrix structure to press the patrix structure on a side of the barrier paper with the protective layer, and push the barrier paper in the matrix structure, whereby a paper side of the barrier paper faces the matrix structure, thereby modifying a fiber structure of the paper in the barrier paper by at least one of the following effects: breaking paper fibers, compressing of the paper fibers, densifying of the paper fibers; resulting in a modified folding behavior of the barrier paper and in maintaining a substantially unchanged shape of the barrier paper over its lifetime.

In a preferred embodiment, the apparatus further comprises at least a portion of a surface of the first embossing tool with a plurality of microscopic structures protruding from the surface; a smooth surface structure on the second embossing tool, corresponding to the at least one portion of the surface of the first embossing tool at a time of embossing; and whereby the first embossing case is further configured to apply a pressure between the smooth surface structure on the paper side of the barrier paper, whereby the protective layer faces the microscopic structures, thereby enhancing determined barrier properties of the barrier paper to at least one of the following effects: densifying the protective layer, modifying hydrophobic properties of the protective layer, modifying optical properties of the protective layer, adding folding properties of the protective layer, modifying optical properties of the protective layer, modifying tactile properties of the protective layer.

In a further preferred embodiment, the first and second embossing tools are mounted in a quick exchange device.

In a further preferred embodiment, the apparatus further comprises a heating means configured to heat at least one of the first and second embossing tools, and/or the barrier paper at the time of embossing the barrier paper.

In a further preferred embodiment, the apparatus further comprises a second embossing system with a third embossing tool and a fourth embossing tool configured to cooperate with the third embossing tool to emboss the barrier paper; a plurality of microscopic structures protruding from the surface on the third embossing tool; a smooth surface structure on the fourth embossing tool; whereby the second embossing system is configured to receive the barrier paper when it is inserted between the third and the fourth embossing tools, and to apply a pressure between the smooth surface structure on the paper side of the barrier paper, whereby the protective layer faces the microscopic structures, thereby enhancing determined barrier properties of the barrier paper to at least one of the following effects: densifying the protective layer, modifying hydrophobic properties of the protective layer, adding folding properties to the protective layer, modifying optical properties of the protective layer, modifying tactile properties of the protective layer; and whereby further the second embossing system is configured to feed the embossed barrier paper to the first embossing system.

In a further preferred embodiment, the smooth surface is provided on an entirety of a working surface of the fourth embossing tool, and the plurality of microscopic structures is provided on an entirety of a working surface of the third embossing tool.

In a further preferred embodiment, the apparatus further comprises a heating means configured to heat at least one of the third and fourth embossing tool, and/or the barrier paper at the time of embossing the barrier paper.

In a further preferred embodiment, the protective layer comprises an added layer of material different than that of the paper, configured to provide determined barrier properties, or a layer-zone of paper modified to provide the determined barrier properties.

In a further preferred embodiment, in order to preserve the integrity of the protective layer, the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made, is substantially a second circular arc having a second radius R2, whereby R1>R2.

In a further preferred embodiment, the first radius is larger than 15 μm.

In a further preferred embodiment, in order to preserve the integrity of the protective layer, the patrix structure is configured to comprise at a summit of the patrix structure a third surface S3 and the matrix structure is configured to comprise at a bottom of the matrix surface a fourth surface S4, such that when a first embossing force F is applied to the patrix structure a first local contact pressure F/S3 with the protective layer on the side of the patrix structure has a value smaller than a second local contact pressure F/S4 with the paper side on the side of the matrix structure.

In a further preferred embodiment, the barrier comprises an additional protective layer on a side of the barrier paper opposite to the side of the protective layer, and in order to preserve the integrity of the protective layer, the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made, is substantially a second circular arc having a second radius R2, whereby the first radius R1 and the second radius R2 differ by less than 25%.

In a further preferred embodiment, the first radius R1 and the second radius R2 are each larger than 25 μm.

In a further preferred embodiment, the patrix structure and the matrix structure are configured such that at a time of embossing the barrier paper in the first embossing system, there is a gap creating a locally enlarged distance between a summit of the patrix structure and a bottom of the matrix structure that is large than a thickness of the barrier paper, thereby enabling to avoid pressing the microscopic structures embossed in the second embossing system.

In a further preferred embodiment, the gap measures between 5 μm and 50 μm.

BRIEF DESCRIPTION OF THE DRAWINGS

The invention will be better understood through the description of preferred examples of embodiments and in reference to the drawings, wherein.

Same references will be used to designate same or similar features throughout all the figures.

DETAILED DESCRIPTION OF PREFERRED EXAMPLES OF EMBODIMENT OF THE INVENTION

It has been found through experimentation that combined embossing of the above-described technologies of prior art in barrier paper with a single pair of embossing rollers, or a successive embossing of barrier paper in separate embossing systems of the above-described technologies of prior art (microscopic structures and macroscopic structures) surprisingly provides an embossed product that demonstrates a new synergy of effects, i.e., in which improved possibilities of folding of the packaging material, and improved properties of the embossed protective layers are achieved.

The invention provides a method for embossing a barrier paper comprising a protective barrier zone on anyone of its sides or on both of its sides in which a functionality of the embossed protective layer(s) may be enhanced, but also an improved possibility of folding the barrier paper is obtained. The invention further provides a corresponding apparatus.

Figure 1:
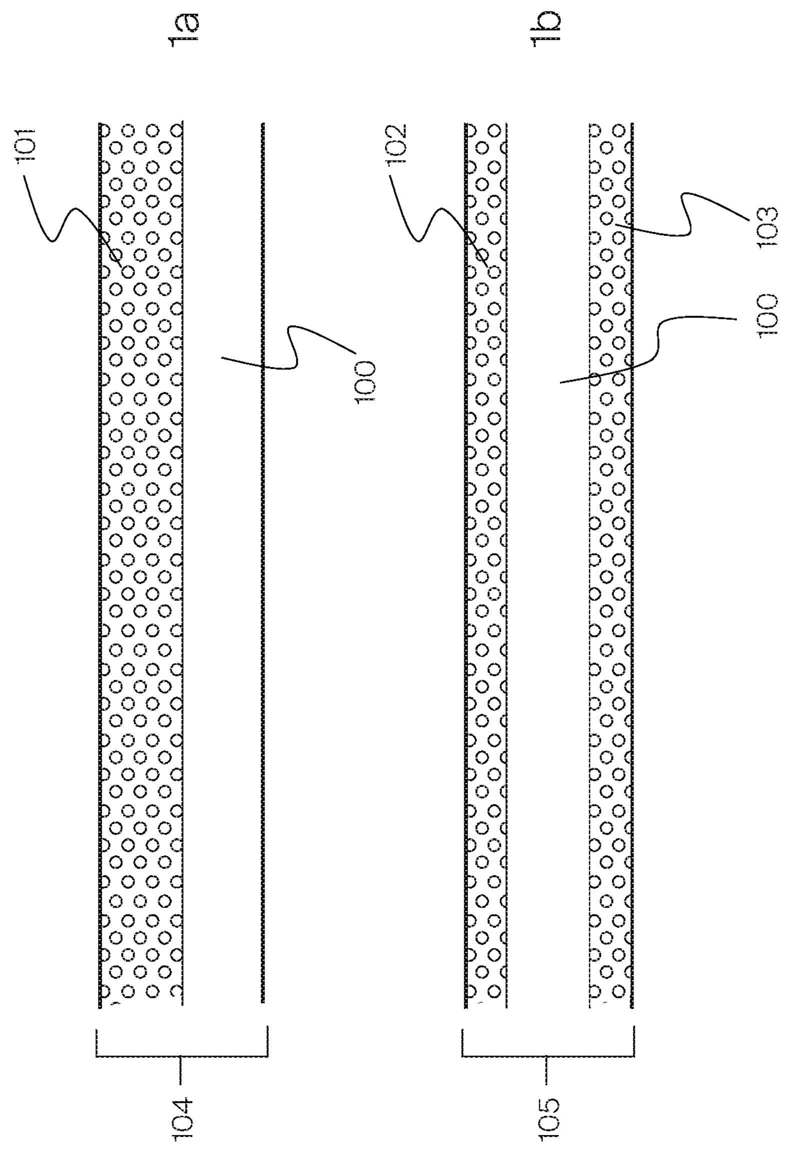
FIG. 1 illustrates examples of barrier paper.

FIGS. 1*a* and 1*b* illustrate examples of barrier paper that may be embossed by means of the method and apparatus of the invention. Barrier paper as such is a product well known in the art, which also continuously continues to be developed and improved. More information about barrier paper and its protective layers is given in the above section "definitions and vocabulary." FIG. 1*a* shows an example of a barrier paper 104 which comprises a sheet of paper 100 and a protective layer 101 on one of the sides of the paper 100. FIG. 1*b* shows an example of a barrier paper 105 which comprises the sheet of paper 100 and protective layers 102 and 103 on respective sides of the paper 100. The protective layers 102 and 103 may or may not be of same nature, and may be adapted in their constituency depending on the intended use of the barrier paper 105.

Figure 2:
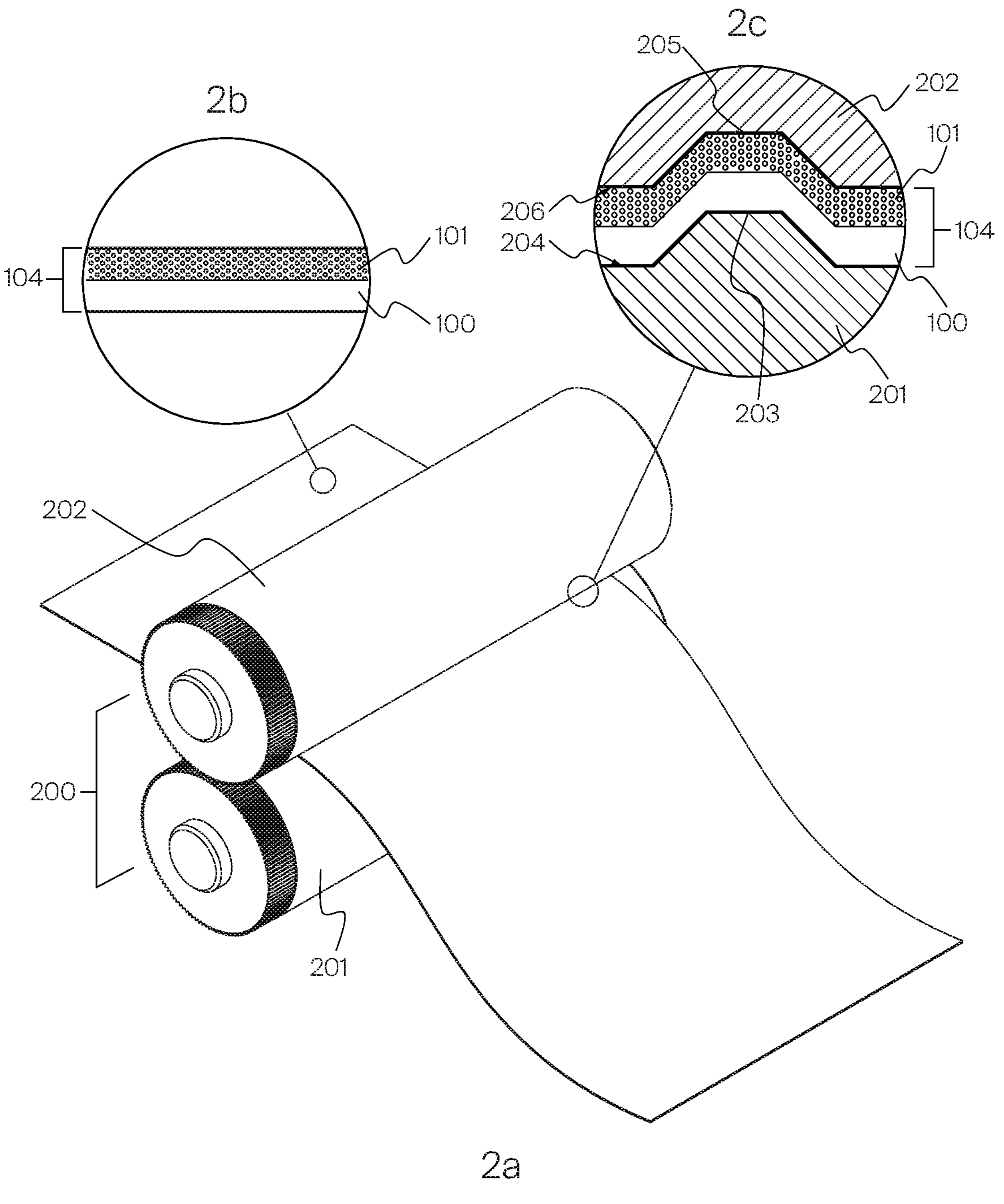
FIG. 2 schematically illustrates an embossing apparatus and a barrier paper embossed therewith according to an example embodiment of the invention.

FIGS. 2*a*, 2*b* and 2*c* schematically illustrate an embossing apparatus 200 and a barrier paper 104 being embossed therewith according to an example embodiment of the invention. FIG. 2*a* represents the embossing apparatus 200 which comprises a first embossing tool 201 embodied as an embossing roller and a second embossing tool 202 also embodied as an embossing roller, and configured to cooperate with the first embossing tool 201. Of course, the first embossing tool 201 and the second embossing tool 202 are part of an embossing system which may comprise a frame, a cassette, and pressure-applying means not illustrated here for an easier readability. The barrier paper 104, a section of which is shown in magnified view of FIG. 2*b*, may be fed to the embossing system to be embossed between the first embossing tool 201 and the second embossing tool 202. FIG. 2*c* is a magnified view of the barrier paper 104 being embossed by the first embossing tool 201 and the second embossing tool 202. More precisely, the first embossing tool 201 is provided with a patrix structure 203. The patrix structure 203 is explained in the section "definitions and vocabulary" herein above together with a matrix structure. As such, the patrix structure 203 is a positive projection of a structure to emboss, departing from a mean surface 204 of the patrix-embossing tool 201—the first embossing tool 201 is a patrix-embossing tool. The second embossing tool 202, which is a matrix-embossing tool, is provided with a matrix structure 205, which enter a mean surface 206 of the second embossing tool 202, and is complementary to the patrix structure 203. In a preferred embodiment, the matrix structure 205 and the patrix structure 203 are non-congruent, as described in prior art herein above. The matrix structure 205 corresponds to the patrix structure 203 in such a manner that when embossing the barrier paper 104, a functionality of the protective layer 101 is preserved, i.e., no functional deterioration of the protective layer 101 is caused by the effect of embossing. The barrier paper 104 is being embossed by a pressing of the patrix structure 203 on the paper side 100, which is the side of the barrier paper 104 opposite to the side with the protective layer 101. This pushes the barrier paper 104 in the matrix structure 205, whereby the protective layer 101 faces the matrix structure 205. This may modify a fiber structure of the paper 100 in the barrier paper 104 by at least one of the following effects: breaking of paper fibers, compressing of the paper fibers, densifying of the paper fibers; resulting in a modified folding behavior of the barrier paper and in maintaining a substantially unchanged shape of the barrier paper over its lifetime.

Figure 3:
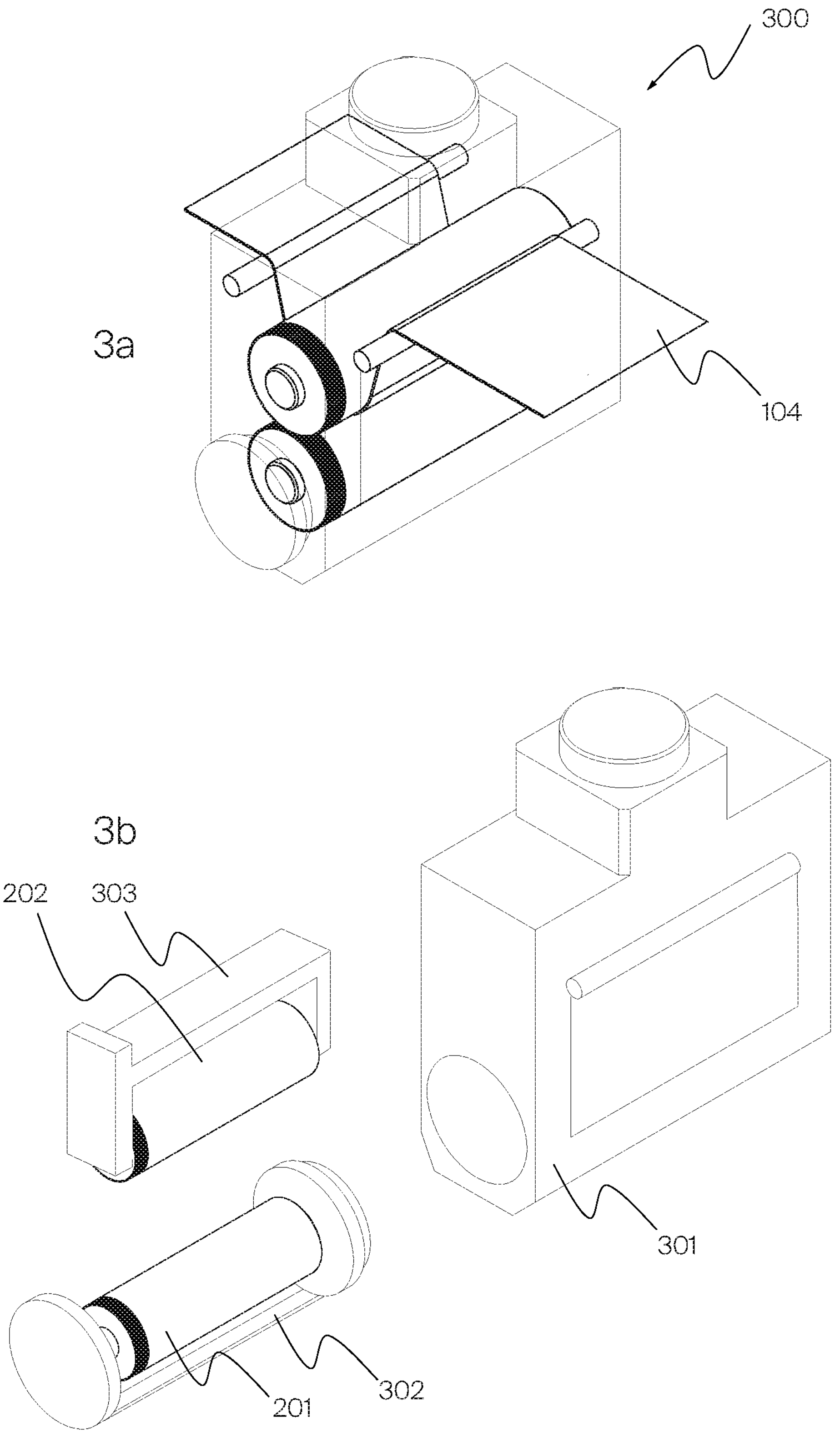
FIG. 3 schematically illustrates an embossing system used in the embossing apparatus in an assembled and in an exploded view.

FIGS. 3*a* and 3*b* schematically illustrate an embossing system 300 used in the embossing apparatus and method to emboss the barrier paper 104. FIG. 3*a* illustrates the embossing system 300 in an assembled state, where a path of the barrier paper 104 being embossed is also visible, while FIG. 3*b* gives a simplified exploded view comprising various component of the embossing system 300, including a mount 301, a generally cylindrical sleeve supporting the roller 302 for mounting the first embossing tool 201 and a fork 303 for mounting the second embossing tool 202 in the mount 301.

The embossing system 300 may preferably be configured as a quick exchange device, as is defined in the dedicate definition and vocabulary section above.

Figure 4:
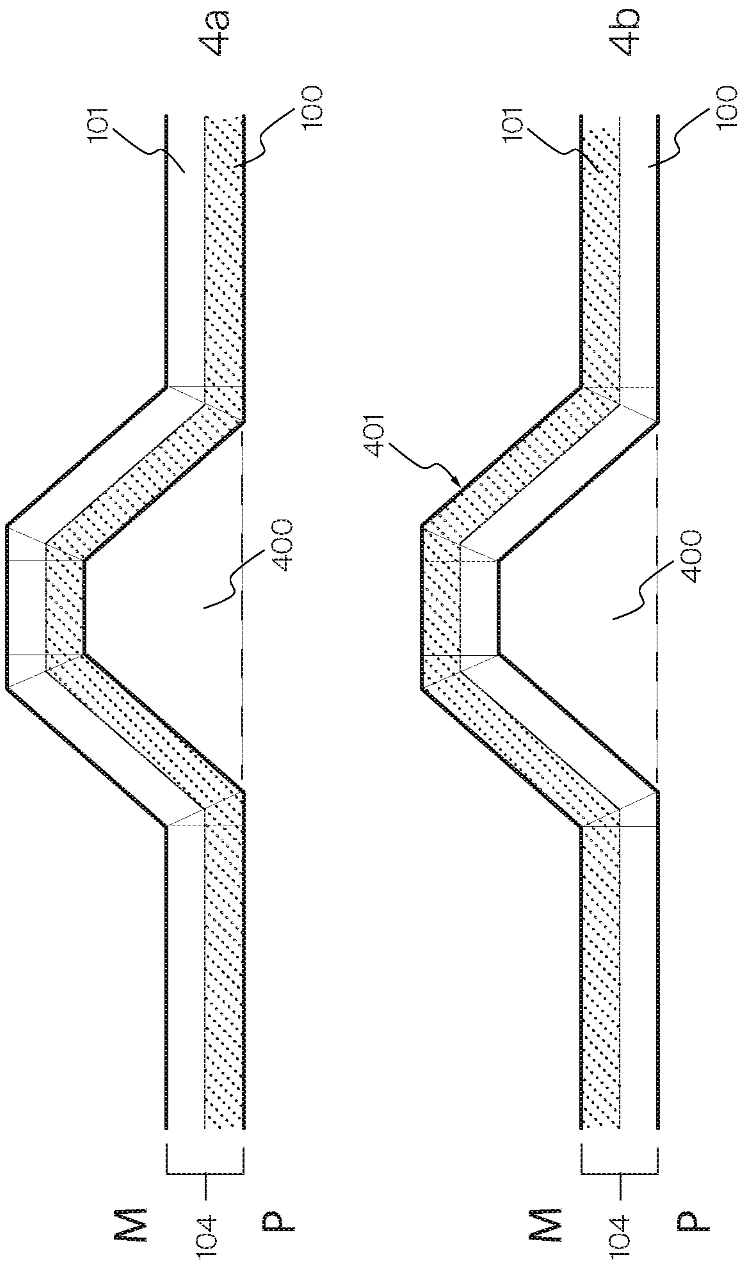
FIG. 4 schematically illustrates configurations of barrier paper embossed with a macroscopic structure according to example uses of the invention.

FIGS. 4*a* and 4*b* schematically illustrate configurations of the barrier paper 104 being embossed with a macroscopic structure between a patrix embossing tool P and a matrix embossing tool M. The tools are only suggested but not textured in the figure on each side of the barrier paper 104. In the example use of the invention in FIG. 4*a* the barrier paper 104 has the protective layer 101 towards the patrix tool P, i.e., a patrix structure 400 pushes against the protective layer 101. In the example use of the invention in FIG. 4*b* the barrier paper 104 has the protective layer 101 towards the matrix tool M, i.e., the patrix structure 400 pushes against the paper side 100 while the protective layer 101 is towards a matrix structure 401.

Figure 5:
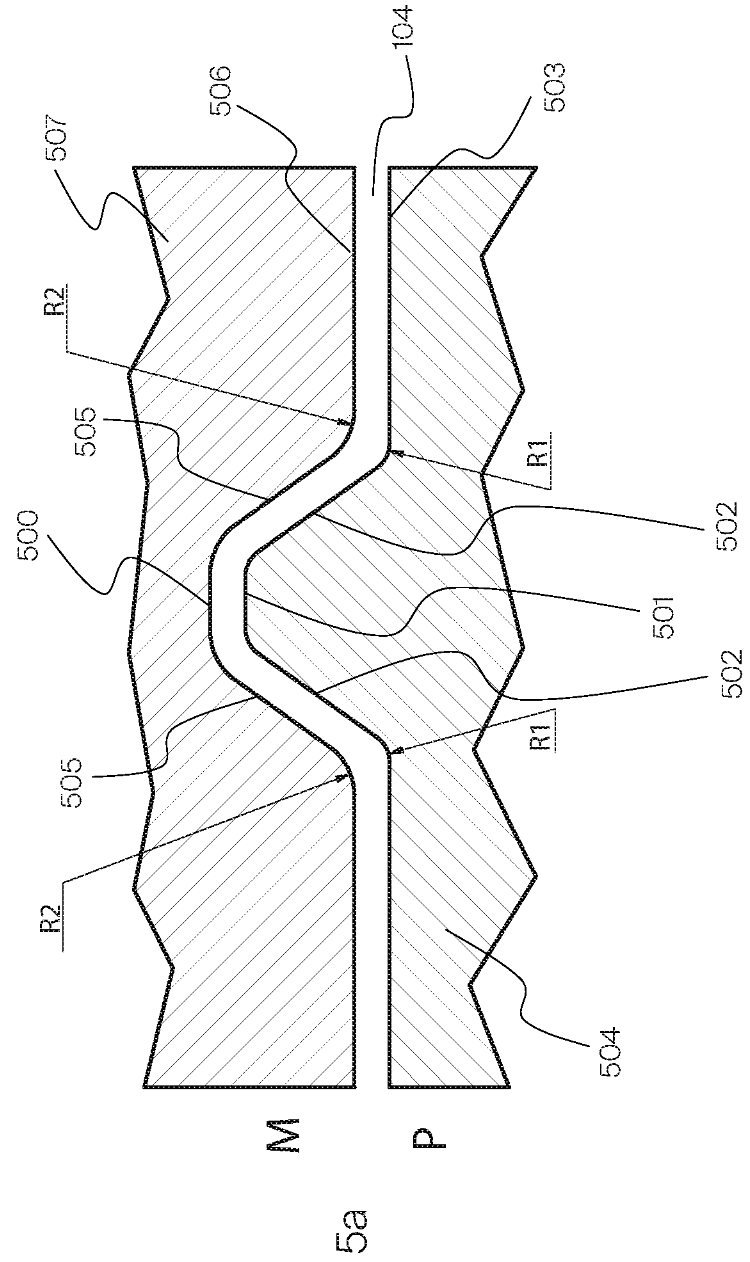
FIG. 5 schematically illustrates cooperating embossing tools with a view of radii used to preserve a functionality of a protective layer after embossing (barrier paper and protective layer not illustrated) according to a preferred example embodiment of the invention.

FIG. 5 schematically illustrates cooperating embossing tools, i.e., the patrix embossing tool P and the matrix embossing tool M, with a view of radii R1 and R2 in these tool as used to preserve a functionality of the protective layer (barrier paper and protective layer not illustrated in FIG. 5) of a barrier paper 104 after embossing according to a preferred example embodiment of the invention. In a preferred embodiment, the barrier paper has a single side with a protective layer. The barrier paper 104 to be embossed may for example have a thickness that is larger than 30 μm but generally below 300 μm, whereby thickness of the protective layer is typically in a range between 5 and 50 μm. It seems that a junction between a lateral side 502 of a patrix structure 501 and the base (mean) surface 503 of an embossing tool 504 from which the patrix structure 501 protrudes, and a junction between a lateral side 505 of a matrix structure 500 and the base (mean) surface 506 of an embossing tool 507 in which the matrix structure 500 recesses are potential zones of fracture during embossing and require for particular considerations.

In a preferred embodiment of the invention, with the protective layer facing the matrix structure 500 (barrier paper and protective layer not illustrated in FIG. 5), the junction between the lateral side 502 of the patrix structure 501 and the base surface 503 of the embossing tool 504 from which the patrix structure 501 protrudes is substantially a first circular arc having a first radius R1, and the junction between the lateral side 505 of the matrix structure 500 and the base surface 506 of the embossing tool 507 in which the matrix structure 500 is made, is substantially a second circular arc having a second radius R2, whereby R2>R1. In a further preferred embodiment, R1 is larger than 15 μm, preferably larger than 25 μm.

In a further preferred embodiment of the invention, with the protective layer facing the patrix structure 501 (barrier paper and protective layer not illustrated in FIG. 5), the junction between the lateral side 502 of the positive projection of the patrix structure 501 and the base surface 503 of the embossing tool 504 from which the patrix structure 501 protrudes is substantially a first circular arc having a first radius R1, and the junction between a lateral side 505 of the negative projection of the matrix structure 500 and the base surface 506 of the embossing tool 507 in which the matrix structure 500 is made, is substantially a second circular arc having a second radius R2, whereby R1>R2. In a further preferred embodiment, R2 is larger than 15 μm, preferably larger than 25 μm.

In a further preferred embodiment of the invention, when embossing the barrier paper 100 having protective layers 102 and 103 on its two sides to be embossed, for example as depicted in the barrier paper 100 of FIG. 1*b* but not in FIG. 5, the radius R2 and the radius R1 differ by less than 25%. In a further preferred embodiment when embossing the barrier paper 100 having protective layers 102 and 103 on its two sides, R1 and R2 are larger than 25 μm, preferably larger than 40 μm.

It is understood that the proportions and dimension illustrated in FIG. 5 are schematic only and do not represent a real case with actual measures and proportions. Only the relation between R1 and R2 and the example values indicated in the preceding paragraphs are to be taken into consideration.

It has been empirically verified that the use of junctions with radii that exceed the minimal value as explained herein, has the advantage of reducing the shear stress as the barrier paper 104 is quenched between the patrix structure 501 and the matrix structure 500.

Figure 6:
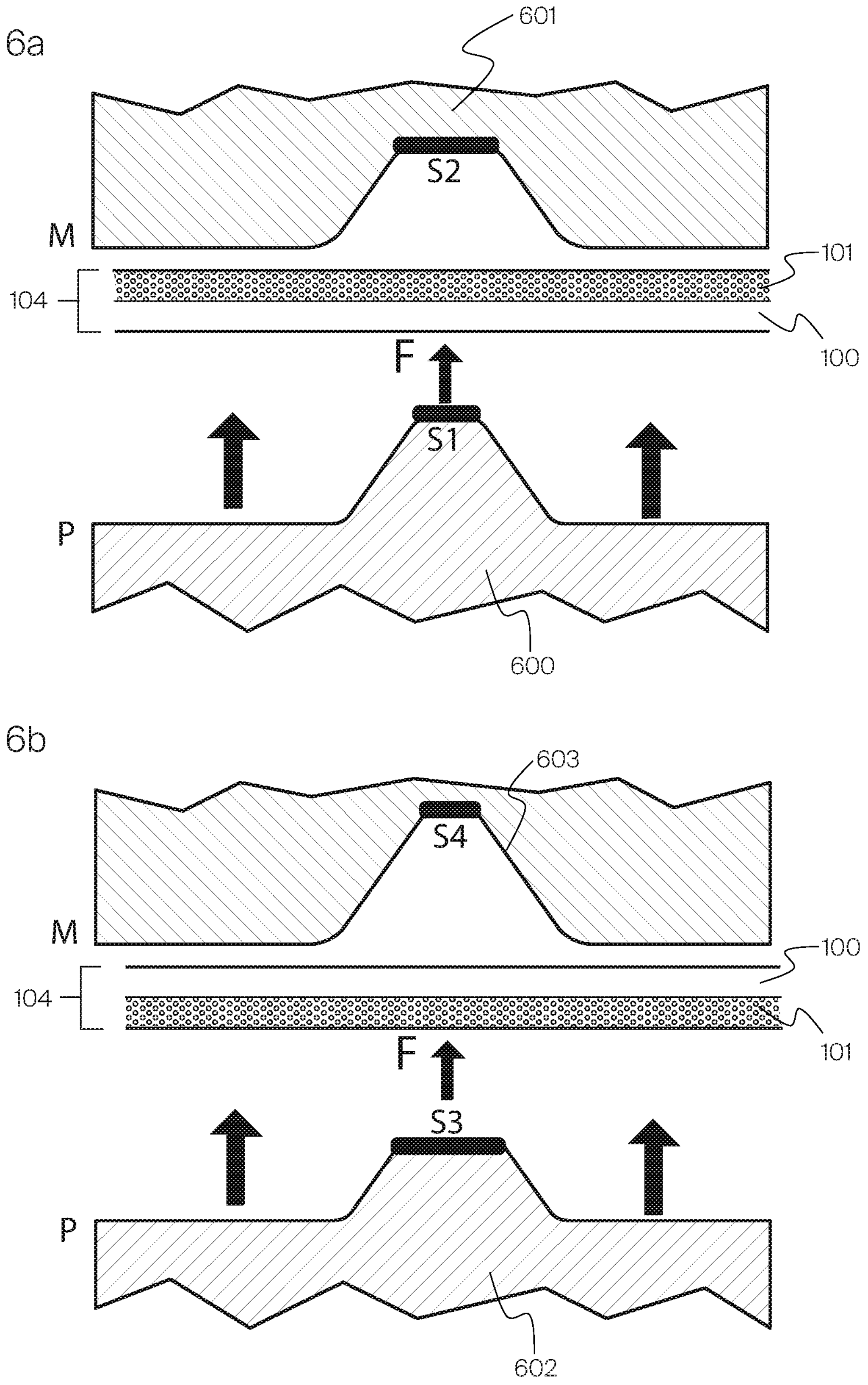
FIG. 6 illustrates how local contact pressure between barrier paper and embossing tools may be adjusted in order to preserve a functionality of a protective layer after embossing according to a preferred example embodiment of the invention.

FIGS. 6*a* and 6*b* illustrate how local contact pressure between barrier paper 104 and embossing tools, i.e., patrix embossing tool P and matrix embossing tool M, may be adjusted in order to preserve a functionality of the protective layer 101 after embossing according to preferred example embodiments of the invention. A reducing of the local contact pressure has a beneficial effect throughout embossing the protective layer 101 of the barrier paper 104 and it may be understood in view of the illustration in FIGS. 6*a* and 6*b*, which each depict a single patrix structure 600, 602 and a single matrix structure 601, 603, and in view of the explanations given hereinafter.

As illustrated in the FIG. 6*a*, in which the barrier paper 104 has the protective layer 101 facing the matrix structure 601 and the paper side 100 facing the patrix structure 600, an embossing force F is applied to the patrix structure 600. It has been empirically found that a surface S1 at a summit of the patrix structure 600 corresponding to a feature intended to be embossed needs to be smaller than a surface S2 at a bottom of the matrix structure 601 corresponding to the feature intended to be embossed in the barrier paper 104.

Therefore, a first local contact pressure F/S1 on the patrix side, i.e., on the paper side 100 is larger than a second local contact pressure F/S2 on the matrix side, i.e., on the protective layer side 101. As a larger local contact pressure directly implies a larger probability to disrupt the protective layer 101, the advantage of embossing the barrier paper 104 with the protective layer 101 facing the matrix structure 601, i.e., facing the smaller contact pressure, is that of preserving an integrity of the protective layer 101.

In a further preferred embodiment, the embossing of the barrier paper 104 occurs with the protective layer 101 facing the patrix structure 602, as illustrated in FIG. 6*b*. In this case a surface S3 at the summit of the patrix structure 602 needs to be chosen to be greater than or at most equal to a surface S4 at a bottom of the matrix structure 603 corresponding to the feature intended to be embossed in the barrier paper 104.

Upon this choice of S3 and S4, a third local contact pressure F/S3 on the patrix side is smaller than a fourth local contact pressure F/S4 on the matrix side. As a larger local contact pressure directly implies a larger probability to disrupt the protective layer 101, the benefit of embossing the barrier paper 104 with the protective layer 101 facing the adapted patrix structure 602, i.e., facing the smaller local contact pressure, is that of preserving an integrity of the protective layer 101.

Figure 7:
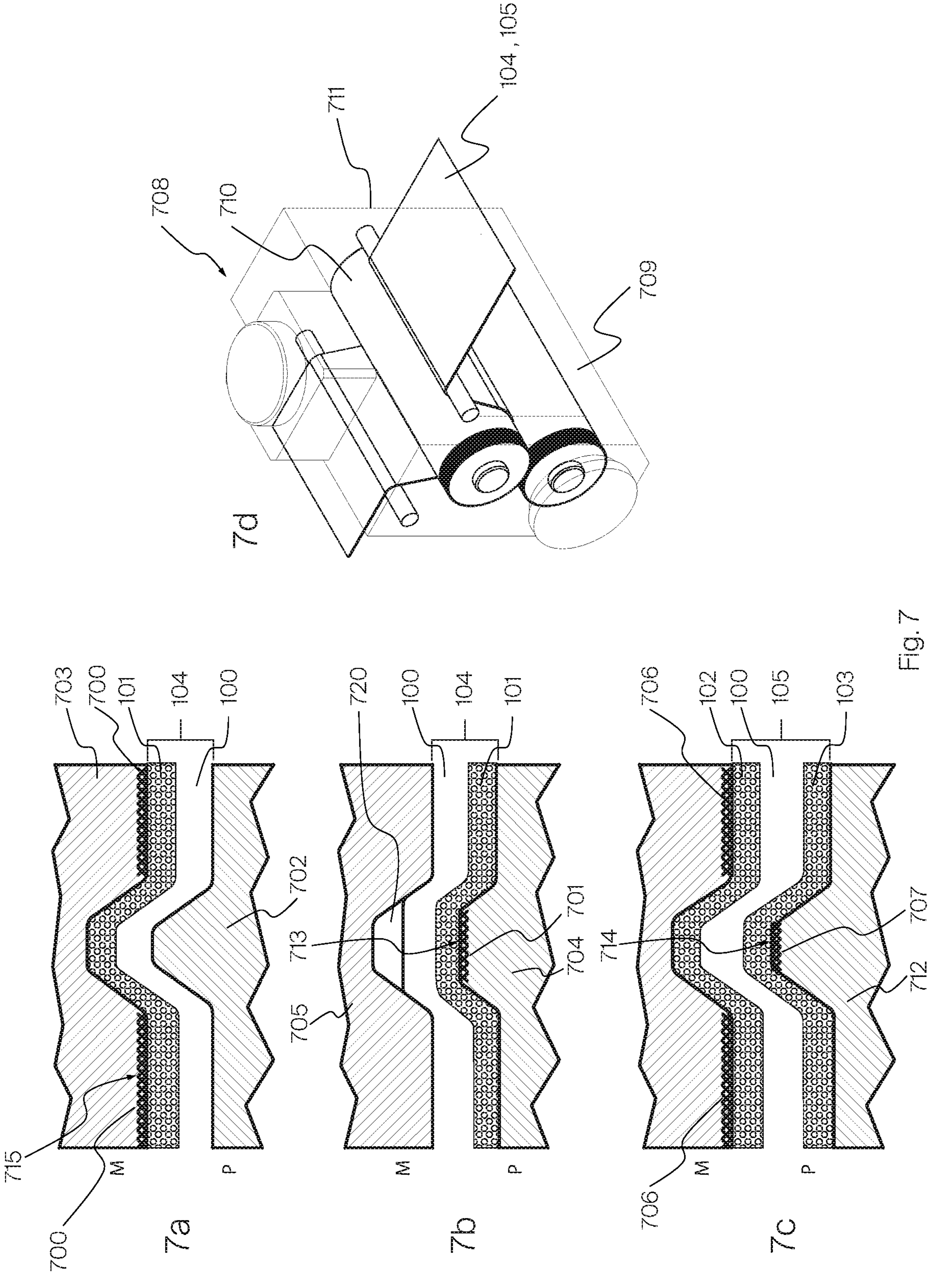
FIG. 7 schematically illustrates an embossing apparatus and barrier paper embossed therewith according to example embodiments of the invention.

FIGS. 7*a*, 7*b*, 7*c* and 7*d* schematically illustrate an embossing apparatus 708 and barrier paper 104, 105 embossed therewith according to example embodiments of the invention. In a preferred embodiment of the invention as illustrated in FIGS. 7*a* and 7*b*, in order to produce a superposition of microscopic embossed features 700, 701 and macroscopic embossed features 702, 703, 704, 705 on the barrier paper 104, the microscopic 700, 701 and the macroscopic 702, 703, 704, 705 structures are combined on at least one of a patrix roller P and the matrix roller M, facing the protective layer 101. Further, in FIG. 7*b*, a space 720 between a matrix structure 705 of a matrix roller M and a sheet of paper 100 of an embossed barrier paper 104 occurs during embossing, because the patrix structure 704 is chosen non-congruent to the matrix structure 705 and it has a shortened height as compared to the patrix structure 702 in FIG. 7*a*. In a particular embodiment as illustrated in FIG. 7*c*, the barrier paper 105 with protective layers 102, 103 on both faces is embossed on both of its sides with microscopic structures 706, 707, i.e., both the patrix roller P and the matrix roller M may carry microscopic structures 706, 707.

As shown in FIG. 7*d*, an embossing apparatus 708 configured to perform the embossing comprises a patrix roller 709/P and a matrix roller 710/M, both mounted in a cassette (not shown in FIG. 7*d*) of the embossing apparatus 708, designed in such a manner that a force (not illustrated in FIG. 7*d*) can be applied between the patrix roller 709/P and the matrix roller 710/M. The cassette and a force-generating device (not illustrated in FIG. 7*d*), e.g., a pneumatic cylinder, are embodied in a frame 711, building the embossing apparatus 708 according to an example of the present invention.

Preferably, the embossing apparatus 708 comprises a heating means (not illustrated in FIG. 7*d*) configured to heat at least one of the patrix roller 709/P, matrix roller 710/M, and/or the protective layer(s) 101, 102, 103 of the barrier paper 104, 105, in order to facilitate a plastic deformation of the protective layer(s) 101, 102, 103 and hence the embossing of microscopic structures 700, 701, 706, 707 into the protective layer(s) 101, 102, 103 of the barrier paper 104, 105. Temperatures above 40° C., preferably above 70° C. are suitable, whereby temperatures exceeding a certain limit, e.g., 150° C. will damage the barrier paper.

In the case of the patrix roller 709/P for use cases illustrated in FIGS. 7*b* and 7*c* with patrix structures 704 and 712 respectively, the microscopic structures 701, 707 are preferably carried by a top surface 713, 714 at a summit of the patrix structure 704, 712 corresponding to an embossed macroscopic feature (the feature has different shapes between FIGS. 7*b* and 7*c*), whereby in the case of the matrix roller 710/M, i.e., for the use case illustrated in FIG. 7*a* with matrix structure 703, the microscopic structures are preferably carried by the base mean surface 715 of the matrix roller 710/M, surrounding the matrix structure 703, while a corresponding surface on the patrix roller P, i.e., a surface opposite to the microscopic structures 700 on the other side of the barrier paper 104 at the time of embossing, is a smooth surface.

The barrier paper 104, 105 is fed into the embossing apparatus 708 such that the protective layer 101, 102, 103 of the barrier paper 104, 105 faces the patrix roller 709 and/or the matrix roller 710, depending on the case, that carries the microstructures 700, 701, 706, 707 and the output is a macro-embossed barrier paper 104, 105 with a micro-structured protective layer 101, 102, 103.

Figure 8:
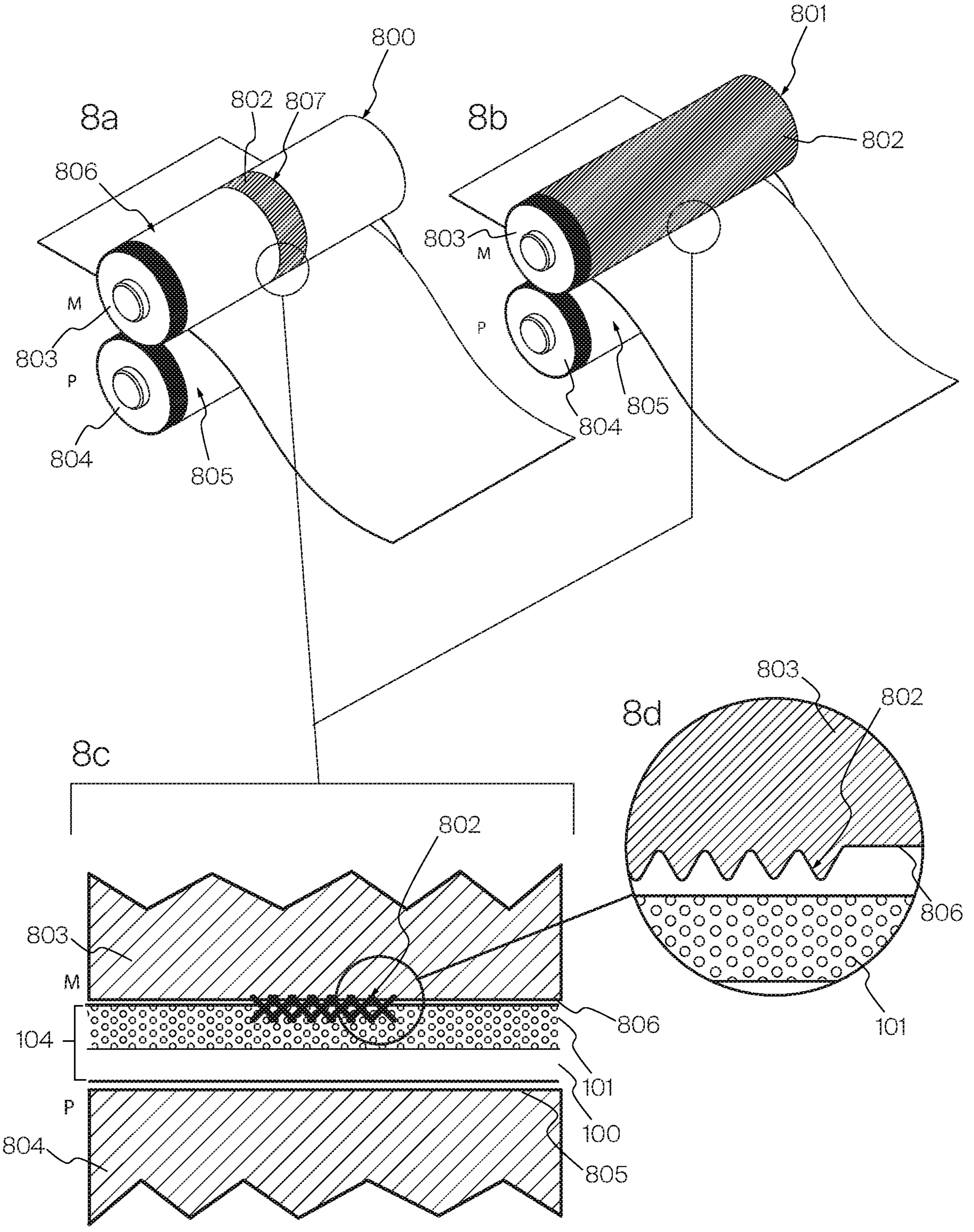
FIG. 8 illustrates embossing systems configured to emboss microscopic structures in a protective layer according to example embodiments of the invention.
Figure 9:
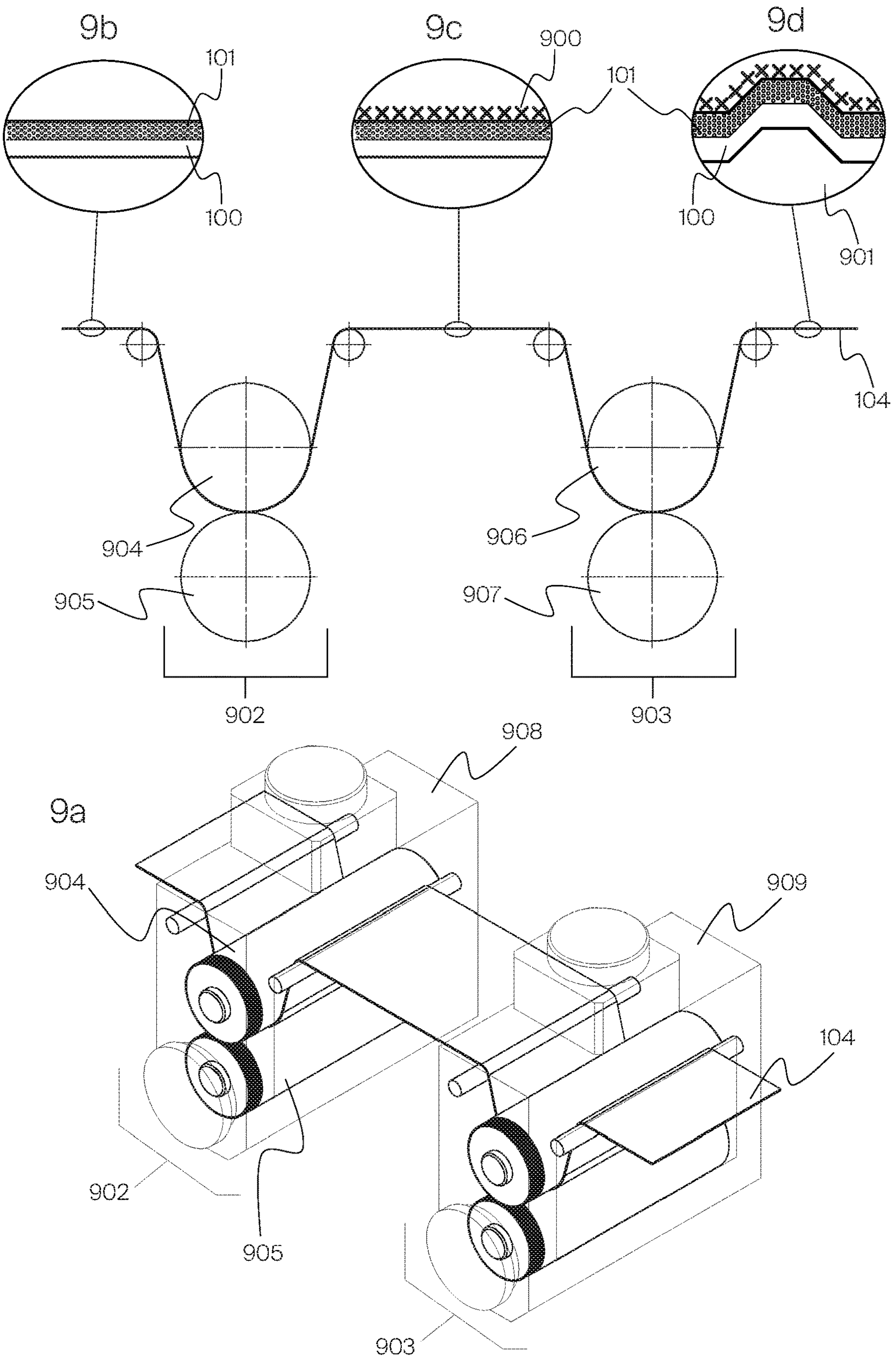
FIG. 9 illustrates an embossing apparatus comprising two embossing systems, and the embossing effect produced on a barrier paper according to an example embodiment of the invention.

FIGS. 8*a*, 8*b*, 8*c* and 8*d* illustrate embossing systems 800, 801 configured to emboss microscopic structures 802 into the protective layer 101 according to example embodiments of the invention. Each embossing system 800, 801 comprises a third embossing tool 804 and a fourth embossing tool 803, which are configured to cooperate with each other to emboss the barrier paper 104. The third embossing tool 804 is provided with at least a smooth surface structure 805, which in all the figures discussed here covers the whole cylindrical surface of the embossing tool 804. The fourth embossing tool 803 is provided with a plurality of microscopic structures 802 protruding from a surface 806 of the embossing tool 803. In FIG. 8*a* the microscopic structures 802 occupy a ring-shaped surface 807 on the cylindrical surface of the fourth embossing tool 803, while in FIG. 8*b* the microscopic structures 802 cover the whole cylindrical surface of the embossing tool 803. FIGS. 8*a* and 8*b* are examples only and other distributions of the microscopic structures 802 are possible. In FIG. 8*c* the microscopic structures 802 are represented by crosses. In the magnified view of FIG. 8*d*, the microscopic structures 802 are shown in proximity to the protective layer 101, suggesting that the microscopic structures 802 are just about to be embossed in the protective layer 101.

In a preferred embodiment of the invention, microscopic structures are engraved (as in FIGS. 8*a*, 8*b*, 8*c*, and 8*d*) in a surface of a roller (such as embossing roller tool 803 for example), such as a plurality of half-spheres, of cones, of regularly- or randomly-shaped surface topography features. In further embodiments, microscopic structures may be engraved in a surface of a patrix structure of a patrix roller corresponding to a macroscopic feature to be embossed or in a surface of a base surface of a matrix roller.

The plurality of surface microscopic structure(s) may imply an array of regularly distributed features, with periodic arrangements, may imply collection(s) of different types of structures, or may imply randomly distributed structures.

A lateral dimension of such individual microscopic surface structures may vary between 1 and 100 μm, whereas a distance between two adjacent microscopic surface structures may vary between 2 and 200 μm.

A maximal height of the microscopic surface structures is restricted by the thickness of the protective layer of the barrier paper to be embossed, as the integrity of the latter has to be preserved upon embossing the microscopic surface features. In a preferred embodiment, this height should not exceed 80% from the thickness of the protective layer of the barrier zone.

There is no particular technical minimal limit of the height of the microscopic surface features; this should be larger than the inherent surface roughness of the barrier zone and could be, typically, higher than 1 μm.

FIGS. 9*a*, 9*b*, 9*c* and 9*d* illustrate embossing apparatuses 902 and 903 comprising two embossing systems, and the embossing effect produced on a barrier paper 104 according to an example embodiment of the invention. In the preferred embodiment illustrated in FIGS. 9*a*, 9*b*, 9*c*, 9*d*, in order to produce a superposition of embossed microscopic structure (s) 900 and embossed macroscopic structure(s) 901 embossing on the barrier paper 104, whereby microscopic structures 900 are embossed into the protective layer 101 of the barrier paper 104, two embossing apparatuses 902 and 903 are combined, such that barrier paper 104 embossed primarily by the second embossing apparatus 902, already carries the embossed microscopic structures on the protective layer 101 when it is fed into the first embossing apparatus 903 that is configured to perform the macroscopic embossing 901, and is further designed in such a manner that the macroscopic embossing is performed without pressing (flattening) the previously embossed microstructures 900.

The second embossing apparatus 902 performing the embossing of microscopic structures 900 comprises a surface structured roller 904, preferably with microscopic structures as previously described, and a smooth surface counter-roller 905, both mounted in a cassette (not illustrated in FIG. 9*a*), designed in such a manner that a force can be applied between the surface structured roller 904 and the smooth surface counter-roller 905. The cassette and a force generating device (not illustrated in FIG. 9*a*), e.g., a pneumatic cylinder, are embodied in a frame 908, building the first embossing apparatus 902 for microstructures embossing according to the present invention.

Preferably, the second embossing apparatus 902 performing the embossing of microscopic structure 900 comprises a means for heating (not illustrated in FIG. 9*a*) that is configured to heat the surface structured roller 904 and/or the protective layer 101, in order to facilitate the plastic deformation of the protective layer 101 and thus also the microscopic embossing into the protective layer 101 of the barrier paper 104. Temperatures above 40° C., preferably above 70° C. are suitable, whereby temperatures exceeding a certain limit, e.g., 150° C. will damage the barrier paper.

Alternatively, the microscopic structure(s) 900 are transferred from the surface structured roller 904 into a UV-sensible protective layer (not illustrated in the figures), which is UV-cured after the transfer, constituting a micro-structured protective layer 101 of the barrier paper 104.

The first embossing apparatus 903 performing the embossing of macrostructures 901 comprises a patrix roller 907 and a matrix roller 906, both mounted in a cassette (not illustrated in FIG. 9*a*), designed in such a manner that a force can be applied between the patrix roller 907 and the matrix roller 906. The cassette and a force-generating device (not illustrated in FIG. 9*a*), e.g., a pneumatic cylinder, are embodied in a frame 909, building the second embossing apparatus 903 for macrostructures embossing according to the present invention.

Figure 10:
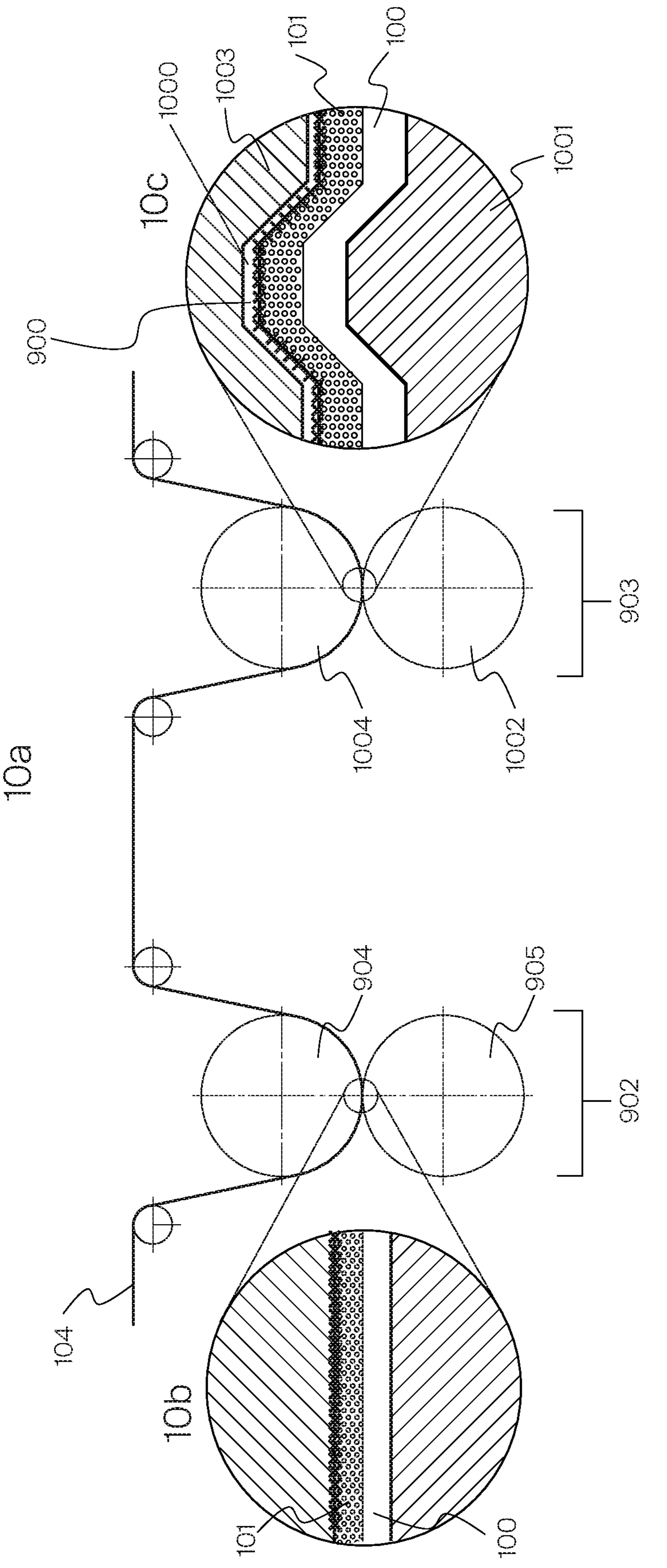
FIG. 10 illustrates separate stages of an embossing method, also involving providing gap between a patrix structure and a matrix structure according to an example embodiment of the invention.

In a particular embodiment of the invention illustrated in FIGS. 10*a*, 10*b* and 10*c*, a gap 1000 between a patrix structure 1001 of a patrix roller 1002 in the first embossing apparatus 903 and a corresponding matrix structure 1003 of a matrix roller 1004 is chosen to be configured as to be larger at the time of embossing barrier paper 104 than the thickness of the barrier paper 104, i.e., the thickness of paper 100 added to the thickness of the protective layer 101, this at least on one section, preferably between 5 μm and 50 μm. This locally enlarged distance created by the gap 1000 between the patrix structure 1001 and the matrix structure 1003 allows performing the macroscopic embossing of the barrier paper 104 without pressing (flattening) the microstructures 900 previously embossed by the second embossing apparatus 902 and thus existing on the protective layer 101 of the barrier paper 104.

The barrier paper 104 is fed into the microstructure embossing apparatus 902 such that the protective layer 101 of the barrier paper 104 faces the surface microstructured roller 904 and the paper side 100 faces the smooth surface counter-roller 905.

The embossed barrier paper 104 as output of the microstructure embossing apparatus 902, i.e., the barrier paper 104 with the microstructured protective layer 101, is subsequently fed into the macrostructure embossing apparatus 903.

The embossed barrier paper 104 as output of the macrostructure embossing apparatus 903 is a macro-embossed barrier paper 104 with the protective layer 101 that carries embossed microscopic structure(s) 900 on its surface. The microscopic structure(s) 900 may enhance the barrier properties of the barrier paper 104 and may compensate possible functionality losses that may occur due the macroscopic embossing.

Figure 11:
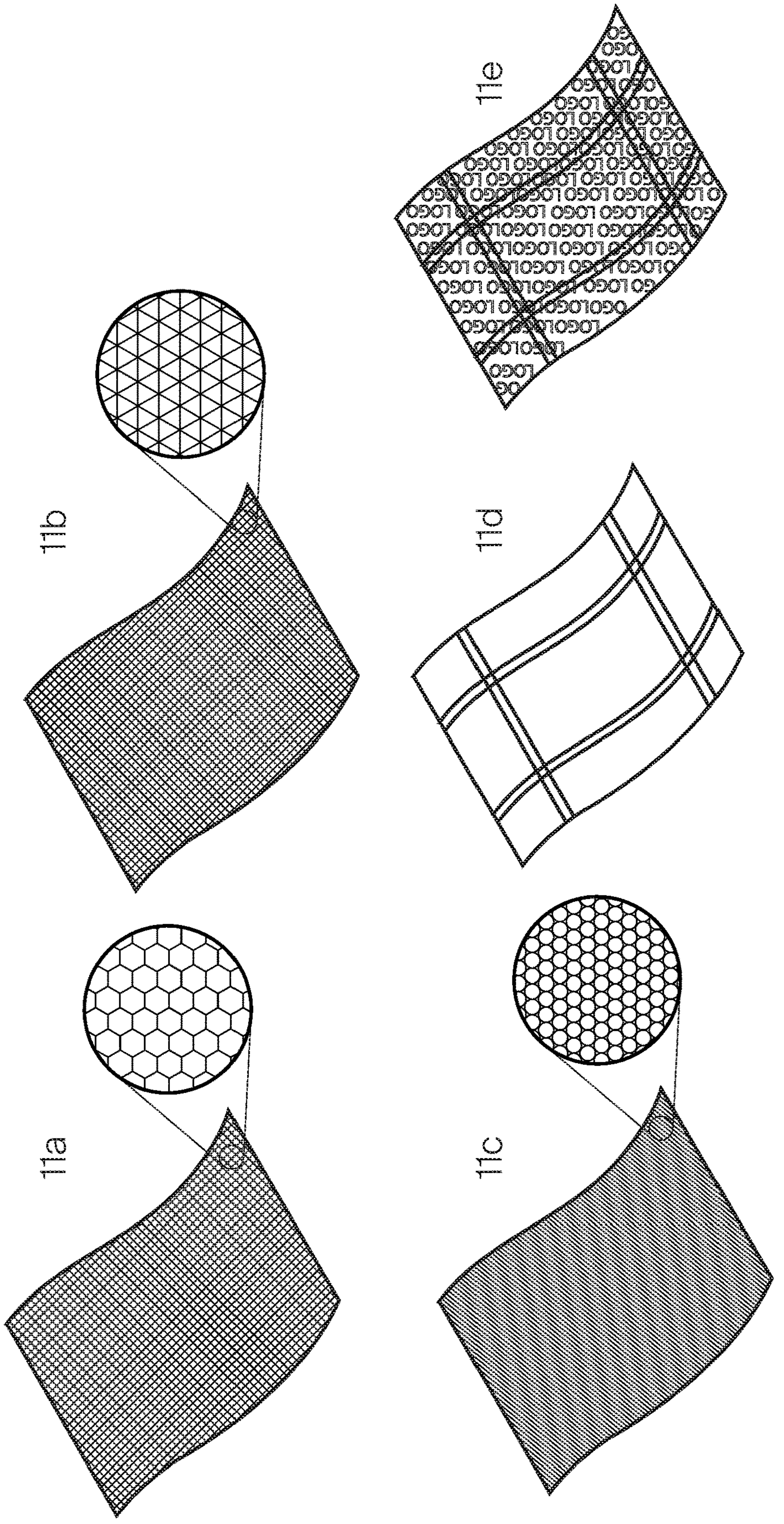
FIG. 11 illustrates a number of products of embossed barrier paper that may be produced by means of the example embodiments of the invention.

FIGS. 11*a* to 11*e* illustrate a number of products of embossed barrier paper that may be produced by means of example embodiments of the invention. The barrier paper in FIGS. 11*a* to 11*c* is overall embossed with regularly spaced and distributed patterns, honeycombs in FIG. 11*a*, triangles in FIG. 11*b* and circles in FIG. 11*c*, which have the advantage of maintaining a substantially unchanged shape of the barrier paper over its lifetime. The patterns are obtained by macroscopic structure embossing as described in the present document. Each product may be further embossed using microscopic structures as explained in the present document. The product in FIG. 11*d* is a sheet of barrier paper in which macroscopic embossing is applied to obtain a few creasing lines, which have the advantage of privileging determined lines for an easy folding. Of course, the product may be further embossed using microscopic structures as explained in the present document. The product in FIG. 11*e* is based on the product of FIG. 11*d* to which embossing of logo patterns (displaying the term "LOGO" is the present example) is made using either macroscopic embossing, microscopic embossing or even the two types in combination according to explanations given in the present document.

Figure 12:
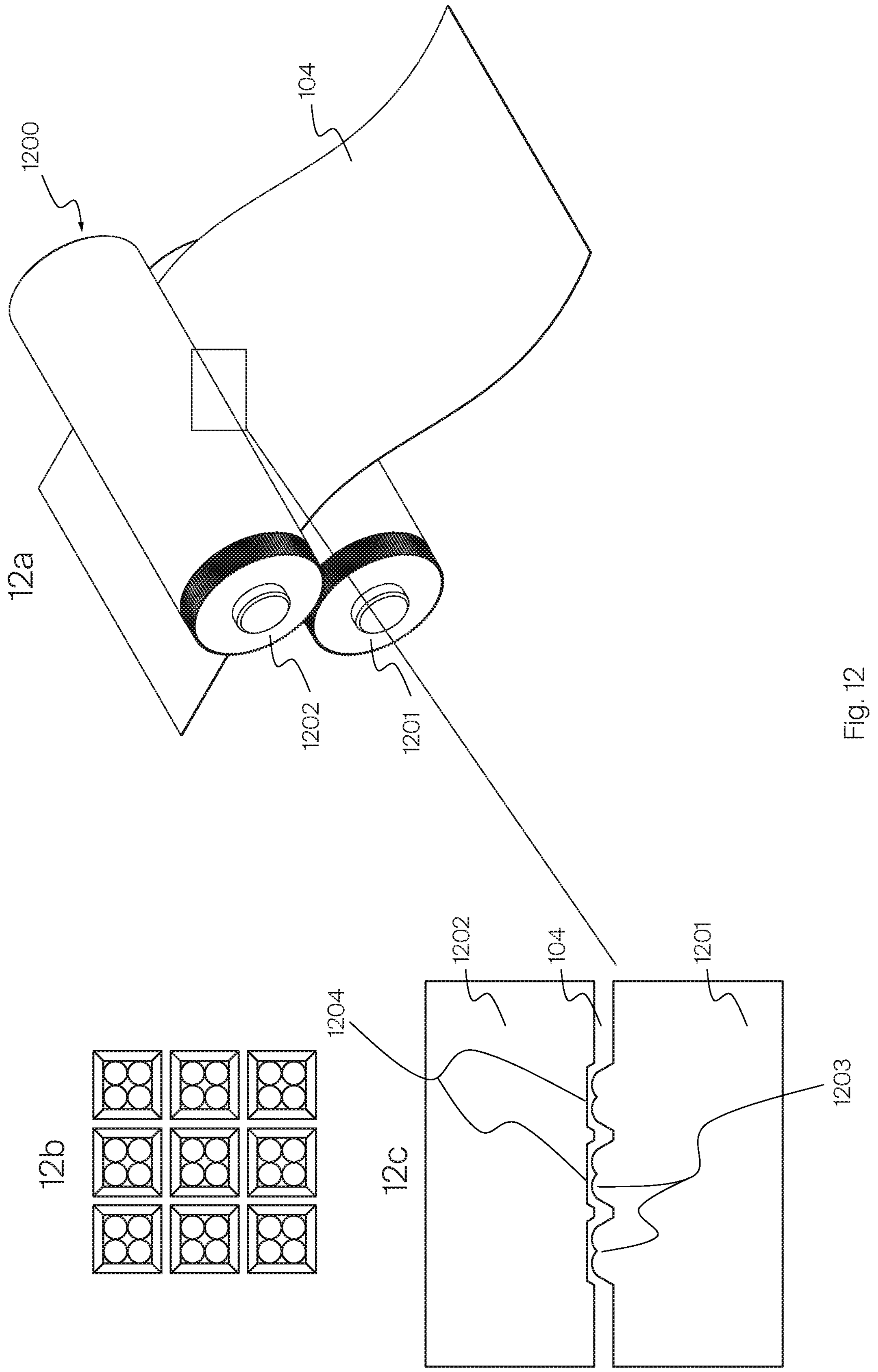
FIG. 12 illustrates an example of an embossed macro-structure in a barrier paper, that may be produced by means of a preferred embodiment of the invention.

FIGS. 12*a* to 12*c* illustrate an example of an embossed macrostructure pattern in a barrier paper 104, that may be produced by means of a preferred embodiment of the invention involving an embossing system 1200. The latter comprises a patrix tool 1201 and a corresponding matrix tool 1202 which is configured to cooperate as shown in the magnified illustration of FIG. 12*c*. The protective layer 101 (not illustrated in FIG. 12) faces the matrix toll 1202. The patrix tool 1201 and matrix tool 1202 comprise patrix structures 1203 and corresponding, non-congruent matrix structures 1204 as shown in FIG. 12*c*. These are distributed over respective surfaces of the patrix tool 1201 and the matrix tool 1202 to produce the embossed pattern illustrated in FIG. 12*b*.

Figure 13:
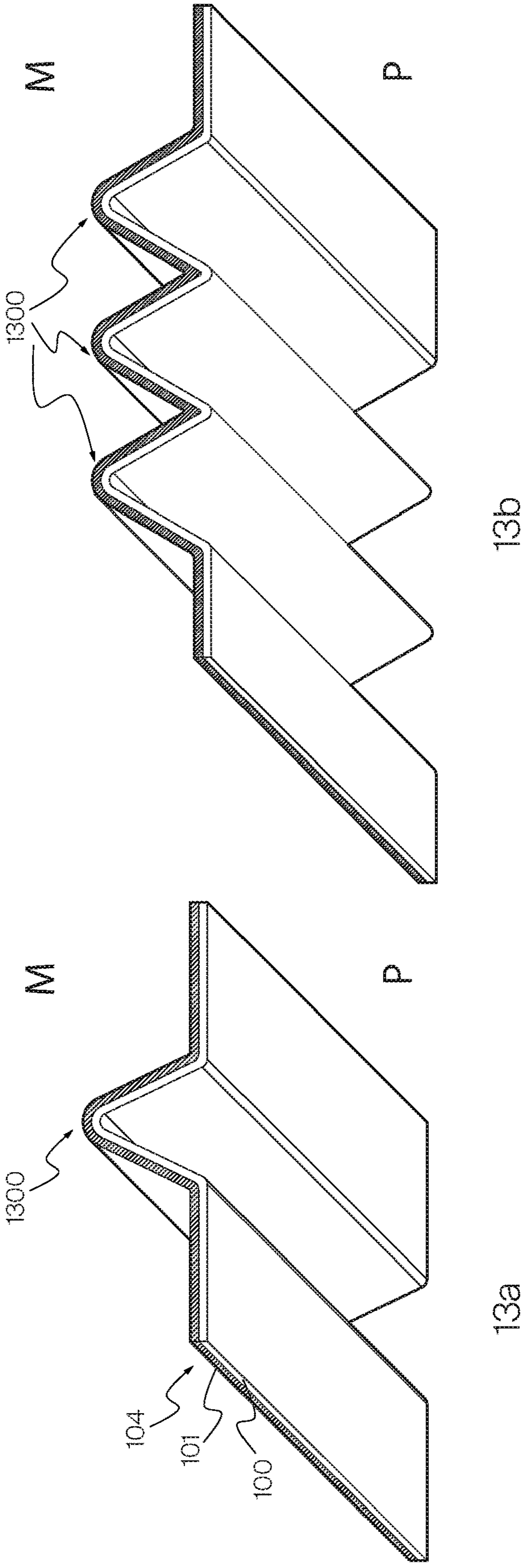
FIG. 13 illustrates examples of creasings embossed in a barrier paper by means of a preferred embodiment of the invention.

FIGS. 13*a* and 13*b* illustrate examples of creasing lines 1300 embossed in a barrier paper 104 by means of a preferred embodiment of the invention, i.e., by means at least of macroscopic structures (not illustrated in the FIGS. 13*a* and 13*b*), wherein a patrix structure was used on a side labelled P to press on the paper side 100 of the barrier paper 104, and the protective layer 101 was facing the corresponding matrix structure labelled M. The product in FIG. 13*a* comprises a single creasing line, while that in FIG. 13*b* comprises a sequence of 3 consecutive creasing lines.

Figure 14:
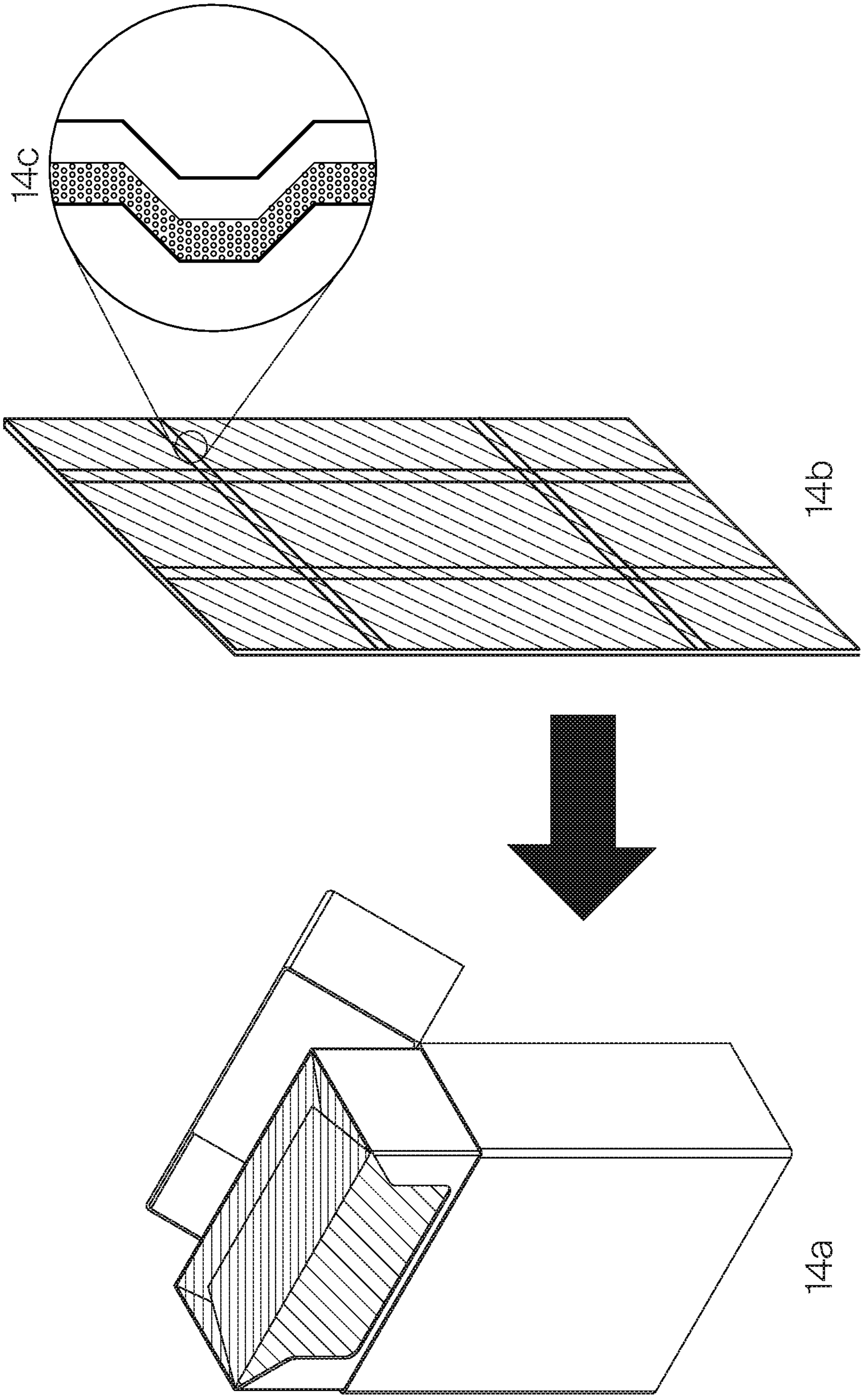
FIG. 14 illustrates examples of packaging materials in form of barrier paper embossed by means of a preferred embodiment of the invention.

FIGS. 14*a* to 14*c* illustrate examples of packaging materials in form of barrier paper embossed by means of a preferred embodiment of the invention. More specifically the barrier paper in FIG. 14*b* was macroscopically embossed to obtain 4 creasing lines designed to privilege a folding of the barrier paper along these lines such that it may be used as inner-liner inside the cigarette box of FIG. 14*a*. FIG. 14*c* is a magnified cross-sectional view through one of the creasing lines of FIG. 14*b* which indicates that the line was obtained by embossing of macrostructures, the paper side being on the side of the patrix structure, and the protective layer on the side of the matrix tool that were used to emboss the barrier paper (note that the patrix and matrix structure are not illustrated).

Figure 15:
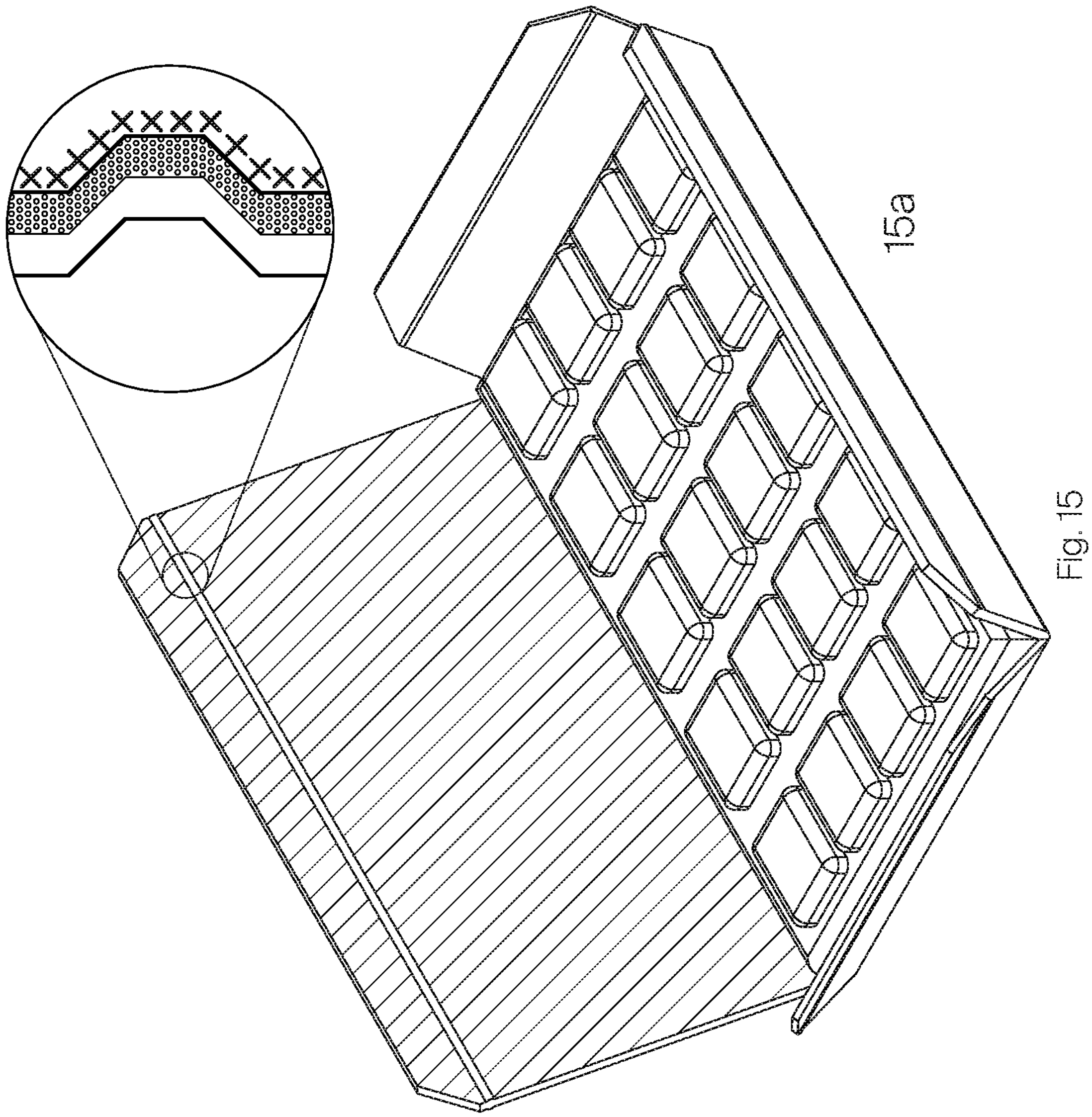
FIG. 15 illustrates a further example of packaging material in form of a barrier paper embossed by means of a further preferred embodiment of the invention.

FIGS. 15*a* and 15*b* illustrates a further example of packaging materials in form of barrier paper embossed by means of a preferred embodiment of the invention. More specifically the barrier paper in FIG. 15*a* was macroscopically embossed to obtain at least one creasing line designed to privilege a folding of the barrier paper along this lines such that it may be used as a flap for sealing a chocolate bar packaging. FIG. 15*b* is a magnified cross-sectional view through the creasing line of FIG. 15*a* which indicates that the line was obtained by embossing of macrostructures and microstructures (as shown by crosses on the illustrated paper), the paper side being on the side of the patrix structure, and the protective layer on the side of the matrix tool that were used to emboss the barrier paper (note that the patrix and matrix structure are not illustrated). The microscopic structures are embossed on the protective layer towards the matrix side.

The invention claimed is:

1. A method for embossing a barrier paper including paper and a protective layer on at least one of its sides, the method comprising:

providing a first embossing system with a first embossing tool and a second embossing tool cooperating with the first embossing tool to emboss the barrier paper;

providing a patrix structure on the first embossing tool;

providing a matrix structure on the second embossing tool, the matrix structure corresponding to the patrix structure such that when embossing the barrier paper, a functionality of the protective layer is preserved; and embossing the barrier paper by inserting the barrier paper between the first and the second embossing tools, applying pressure between the patrix and the matrix structures to press the patrix structure on a paper side which is a side of the barrier paper opposite to the side with the protective layer of the barrier paper, and pushing the barrier paper in the matrix structure, whereby the protective layer faces the matrix structure, thereby modifying a fiber structure of the paper in the barrier paper by at least one of the following effects: breaking of paper fibers, compressing of the paper fibers, and densifying of the paper fibers, resulting in a modified folding behavior of the barrier paper and in maintaining a substantially unchanged shape of the barrier paper over its lifetime, wherein the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made is substantially a second circular arc having a second radius R2, whereby R2>R1.

2. The method for embossing of claim 1, further comprising:

heating at least one of (i) the first and second embossing tools, and (ii) the barrier paper at the step of embossing the barrier paper.

3. The method of claim 1, wherein the protective layer comprises an added layer of material different than that of the paper, the protective layer being configured to provide determined barrier properties, or a layer-zone of paper modified to provide the determined barrier properties.

4. The method of claim 1, wherein the first radius R1 is larger than 15 μm.

5. The method of claim 1, wherein, in order to preserve the functionality of the protective layer, the patrix structure is configured to comprise, at a summit of the patrix structure, a first surface S1, and the matrix structure is configured to comprise, at a bottom of the matrix surface, a second surface S2, such that when a first embossing force (F) is applied to the patrix structure, a first local contact pressure F/S1 with the paper side on the side of the patrix structure has a value greater than a second local contact pressure F/S2 with the protective layer on the side of the matrix structure.

6. The method of claim 1, wherein the barrier paper comprises an additional protective layer on a side of the barrier paper opposite to the side of the protective layer, and the first radius R1 and the second radius R2 differ by less than 25%.

7. The method of claim 6, wherein the first radius R1 and the second radius R2 are each larger than 25 μm.

8. An apparatus for embossing a barrier paper including paper and a protective layer on at least one of its sides, the apparatus comprising:

a first embossing system with a first embossing tool and a second embossing tool which is configured to cooperate with the first embossing tool to emboss the barrier paper;

a patrix structure on the first embossing tool; and a matrix structure on the second embossing tool, the matrix structure corresponding to the patrix structure such that at a time of embossing the barrier paper, a functionality of the protective layer is preserved, wherein the first embossing system is configured to receive the barrier paper when the barrier paper is inserted between the first and the second embossing tools, to apply a pressure between the patrix and the matrix structure to press the patrix structure on the paper side of the barrier paper, and to push the barrier paper in the matrix structure, whereby the protective layer faces the matrix structure, thereby modifying a fiber structure of the paper in the barrier paper by at least one of the following effects: breaking paper fibers, compressing of the paper fibers, and densifying of the paper fibers, resulting in a modified folding behavior of the barrier paper and in maintaining a substantially unchanged shape of the barrier paper over its lifetime, and wherein the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made is substantially a second circular arc having a second radius R2, whereby R2>R1.

9. The apparatus of claim 8, further comprising a heater configured to heat at least one of (i) the first and second embossing tools, and (ii) the barrier paper at the time of embossing the barrier paper.

10. The apparatus of claim 8, wherein the protective layer comprises an added layer of material different than that of the paper, the protective layer being configured to provide determined barrier properties, or a layer-zone of paper modified to provide the determined barrier properties.

11. The apparatus of claim 8, wherein the first radius is larger than 15 μm.

12. The apparatus of claim 8, wherein, in order to preserve the integrity of the protective layer, the patrix structure is configured to comprise, at a summit of the patrix structure, a first surface S1, and the matrix structure is configured to comprise, at a bottom of the matrix surface, a second surface S2, such that when a first embossing force (F) is applied to the patrix structure, a first local contact pressure F/S1 with the paper side on the side of the patrix structure has a value greater than a second local contact pressure F/S2 with the protective layer on the side of the matrix structure.

13. The apparatus of claim 8, wherein the barrier comprises an additional protective layer on a side of the barrier paper opposite to the side of the protective layer, and wherein the first radius R1 and the second radius R2differ by less than 25%.

14. The apparatus of claim 13, wherein the first radius R1 and the second radius R2 are each larger than 25 μm.

15. A method for embossing a barrier paper including a protective layer on at least one of its sides, the method comprising:

providing a first embossing system with a first embossing tool and a second embossing tool cooperating with the first embossing tool to emboss the barrier paper;

providing a patrix structure on the first embossing tool;

providing a matrix structure on the second embossing tool, the matrix structure corresponding to the patrix structure such that when embossing the barrier paper, a functionality of the barrier paper is preserved; and embossing the barrier paper by inserting the barrier paper between the first and the second embossing tools, applying pressure between the patrix and the matrix structures to press the patrix structure on a side of the barrier paper with the protective layer, and pushing the barrier paper in the matrix structure, whereby a paper side of the barrier paper faces the matrix structure, thereby modifying a fiber structure of the paper in the barrier paper by at least one of the following effects: breaking of the paper fiber, compressing of the paper fibers, and densifying of the paper fiber, resulting in a modified folding behavior of the barrier paper and in maintaining a substantially unchanged shape of the barrier paper over its lifetime, wherein the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made is substantially a second circular arc having a second radius R2, whereby R1>R2.

16. An apparatus for embossing of a barrier paper including paper and a protective layer on one of its sides, the apparatus comprising:

a first embossing system with a first embossing tool and a second embossing tool which is configured to cooperate with the first embossing tool to emboss the barrier paper;

a patrix structure on the first embossing tool; and a matrix structure on the second embossing tool, the matrix structure corresponding to the patrix structure such that at a time of embossing the barrier paper, a functionality of the protective layer is preserved, wherein the first embossing system is configured to receive the barrier paper when the barrier paper s inserted between the first and the second embossing tools, to apply a pressure between the patrix and the matrix structure to press the patrix structure on a side of the barrier paper with the protective layer, and to push the barrier paper in the matrix structure, whereby a paper side of the barrier paper faces the matrix structure, thereby modifying a fiber structure of the paper in the barrier paper by at least one of the following effects:

breaking paper fibers, compressing of the paper fibers, and densifying of the paper fibers, resulting in a modified folding behavior of the barrier paper and in maintaining a substantially unchanged shape of the barrier paper over its lifetime, wherein the patrix structure and the matrix structure are configured such that a first junction between a lateral side of the patrix structure and a first base surface of the first embossing tool from which the patrix structure protrudes is substantially a first circular arc having a first radius R1, and a second junction between a lateral side of the matrix structure and a second base surface of the second embossing tool in which the matrix structure is made is substantially a second circular arc having a second radius R2, whereby R1>R2.

17. The method according to claim 15, wherein the barrier paper comprises an additional protective layer on a side of the barrier paper opposite to the side of the protective layer, and wherein the first radius R1 and the second radius R2 differ by less than 25%.

18. The apparatus according to claim 16, wherein the barrier paper comprises an additional protective layer on a side of the barrier paper opposite to the side of the protective layer, and wherein the first radius R1 and the second radius R2differ by less than 25%.

* * * * *